(12) United States Patent
Zhamu et al.

(10) Patent No.: US 8,889,298 B2
(45) Date of Patent: Nov. 18, 2014

(54) SURFACE-MEDIATED LITHIUM ION-EXCHANGING ENERGY STORAGE DEVICE

(75) Inventors: Aruna Zhamu, Centerville, OH (US); ChenGuang Liu, Fairbone, OH (US); Xiqing Wang, Cincinnati, OH (US); Bor Z. Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 429 days.

(21) Appl. No.: 13/199,450

(22) Filed: Aug. 30, 2011

(65) Prior Publication Data

US 2013/0052489 A1   Feb. 28, 2013

(51) Int. Cl.

| | |
|---|---|
| H01M 10/44 | (2006.01) |
| H01M 4/133 | (2010.01) |
| B82Y 30/00 | (2011.01) |
| H01M 4/583 | (2010.01) |
| H01G 11/06 | (2013.01) |
| H01G 11/36 | (2013.01) |
| H01G 11/56 | (2013.01) |
| H01M 4/02 | (2006.01) |

(52) U.S. Cl.
CPC ............... *H01M 4/133* (2013.01); *B82Y 30/00* (2013.01); *H01M 4/583* (2013.01); *H01G 11/06* (2013.01); *H01G 11/36* (2013.01); *H01G 11/56* (2013.01); *Y02T 10/7011* (2013.01); *H01M 2004/021* (2013.01); *H01M 2004/022* (2013.01); *Y02E 60/122* (2013.01); *Y02T 10/7022* (2013.01); *Y02E 60/13* (2013.01)
USPC ........................................ 429/231.8; 429/50

(58) Field of Classification Search
CPC ...... H01M 4/583; H01M 4/625; H01M 4/133
USPC .......... 429/231.1, 231.2, 231.3, 231.4, 231.9, 429/231.95, 50
See application file for complete search history.

(56) References Cited

U.S. PATENT DOCUMENTS

| | | |
|---|---|---|
| 7,071,258 B1 | 7/2006 | Jang et al. |
| 7,623,340 B1 | 11/2009 | Song et al. |

(Continued)

OTHER PUBLICATIONS

U.S. Appl. No. 11/800,728, filed May 8, 2007, A. Zhamu, et al.
U.S. Appl. No. 12/806,679, filed Aug. 9, 2010, C. G. Liu, et al.
U.S. Appl. No. 12/924,211, filed Sep. 23, 2010, C. G. Liu, et al.

(Continued)

*Primary Examiner* — Maria J Laios

(57) ABSTRACT

A surface-mediated, lithium ion-exchanging energy storage device comprising: (a) A positive electrode (cathode) comprising a cathode active material that is not a functional material (bearing no functional group reactive with lithium), but having a surface area to capture or store lithium thereon; (b) A negative electrode (anode) comprising an anode active material having a surface area to capture or store lithium thereon; (c) A porous separator disposed between the two electrodes; and (d) A lithium-containing electrolyte in physical contact with the two electrodes, wherein the anode active material and/or the cathode active material has a specific surface area of no less than 100 m²/g in direct physical contact with the electrolyte to receive lithium ions therefrom or to provide lithium ions thereto; wherein at least one of the two electrodes contains therein a lithium source prior to a first charge or a first discharge cycle of the energy storage device. This new generation of energy storage device exhibits the best properties of both the lithium ion battery and the supercapacitor.

52 Claims, 16 Drawing Sheets

(56) References Cited

U.S. PATENT DOCUMENTS

| | | |
|---|---|---|
| 7,682,736 B2 * | 3/2010 | Kuboki et al. ............... 429/188 |
| 7,745,047 B2 | 6/2010 | Zhamu et al. |
| 2010/0028681 A1 * | 2/2010 | Dai et al. ...................... 428/408 |
| 2010/0119943 A1 * | 5/2010 | Lee et al. ............. 429/231.95 X |
| 2010/0178531 A1 * | 7/2010 | Amaratunga et al. ............ 429/7 |
| 2011/0104571 A1 * | 5/2011 | Zhamu et al. ............ 429/231.95 |

OTHER PUBLICATIONS

U.S. Appl. No. 12/928,927, filed Dec. 23, 2010, A. Zhamu, et al.

U.S. Appl. No. 12/930,294, filed Jan. 3, 2011, A. Zhamu, et al.

S. W. Lee, et al, "High Power Lithium Batteries from Functionalized Carbon Nanotubes," Nature Nanotechnology, 5 (2010) 531-537, (June).

* cited by examiner

Soft carbon

Hard carbon

Carbon Black macro- or meso-pores (A)

(B)

ously high cycle-life.
SURFACE-MEDIATED LITHIUM ION-EXCHANGING ENERGY STORAGE DEVICE This invention is based on the research results of a project sponsored by the US National Science Foundation SBIR-STTR Program.

This application claims the benefits of the following US patent applications:

(a) C. G. Liu, David Neff, Aruna Zhamu, and Bor Z. Jang, "Lithium Super-battery with a Functionalized Disordered Carbon Cathode," U.S. patent application Ser. No. 12/924,211 (Sep. 23, 2010).

(b) Aruna Zhamu, C. G. Liu, David Neff, and Bor Z. Jang, "Surface-Controlled Lithium Ion-Exchanging Energy Storage Device," U.S. patent application Ser. No. 12/928,927 (Dec. 23, 2010).

(c) Aruna Zhamu, C. G. Liu, David Neff, Z. Yu, and Bor Z. Jang, "Partially and Fully Surface-Enabled Metal Ion-Exchanging Battery Device," U.S. patent application Ser. No. 12/930,294 (Jan. 3, 2011).

FIELD OF THE INVENTION

The present invention relates generally to the field of electrochemical energy storage devices and, more particularly, to a totally new lithium ion-exchanging energy storage device wherein both the anode and the cathode do not involve lithium diffusion in and out of the bulk of a solid electrode-active material (i.e., requiring no lithium intercalation or de-intercalation). The lithium storage mechanism in both the anode and the cathode is surface-controlled, obviating the need for solid-state diffusion (intercalation or de-intercalation) of lithium, which otherwise is very slow. This device has the high energy density of a lithium-ion battery and the high power density of a supercapacitor (usually even higher than the power densities of supercapacitors). This device is herein referred to as a surface-mediated, lithium ion-exchanging battery device.

BACKGROUND OF THE INVENTION

Supercapacitors

Ultra-Capacitors or Electro-Chemical Capacitors

Supercapacitors are being considered for electric vehicle (EV), renewable energy storage, and modern grid applications. The high volumetric capacitance density of a supercapacitor derives from using porous electrodes to create a large surface area conducive to the formation of diffuse double layer charges. This electric double layer (EDL) of charges is formed in the electrolyte near the electrode surface when voltage is imposed. The required ions for this EDL mechanism near an electrode are pre-existing in the liquid electrolyte when the cell is made or in a discharged state, and mostly do not come from the opposite electrode. In other words, the required ions to be formed into an EDL near the surface of a negative electrode (anode) active material (e.g., activated carbon particle) do not have to come from the positive electrode (cathode); i.e., not captured or stored in the surfaces or interiors of a cathode active material. Similarly, the required ions to be formed into an EDL near the surface of a cathode active material do not have to come from the surface or interior of an anode active material.

When the supercapacitor is re-charged, the ions (both cations and anions) already in the liquid electrolyte are formed into EDLs near their respective local electrodes (typically via local molecular or ionic polarization of charges). There is no major exchange of ions between an anode active material and a cathode active material. The amount of charges that can be stored (capacitance) is dictated solely by the concentrations of cations and anions that are available in the electrolyte. These concentrations are typically very low (limited by the solubility of a salt in a solvent), resulting in a low energy density. Further, lithium ions are usually not part of preferred or commonly used supercapacitor electrolytes.

In some supercapacitors, the stored energy is further augmented by pseudo-capacitance effects due to some electrochemical reactions (e.g., redox). In such a pseudo-capacitor, the ions involved in a redox pair also pre-exist in the electrolyte. Again, there is no major exchange of ions between an anode active material and a cathode active material.

Since the formation of EDLs does not involve a chemical reaction or an exchange of ions between the two opposite electrodes, the charge or discharge process of an EDL supercapacitor can be very fast, typically in seconds, resulting in a very high power density (typically 5,000-10,000 W/Kg). Compared with batteries, supercapacitors offer a higher power density, require no maintenance, offer a much higher cycle-life, require a very simple charging circuit, and are generally much safer. Physical, rather than chemical, energy storage is the key reason for their safe operation and extraordinarily high cycle-life.

Despite the positive attributes of supercapacitors, there are several technological barriers to widespread implementation of supercapacitors for various industrial applications. For instance, supercapacitors possess very low energy densities when compared to batteries (e.g., 5-8 Wh/kg for commercial supercapacitors vs. 10-30 Wh/Kg for the lead acid battery and 50-100 Wh/kg for the NiMH battery). Lithium-ion batteries possess a much higher energy density, typically in the range of 100-180 Wh/kg, based on the cell weight.

Lithium-Ion Batteries

Although possessing a much higher energy density, lithium-ion batteries deliver a very low power density (typically 100-500 W/Kg), requiring typically hours for re-charge. Conventional lithium-ion batteries also pose some safety concern.

The low power density or long re-charge time of a lithium ion battery is due to the mechanism of shuttling lithium ions between the interior of an anode and the interior of a cathode, which requires lithium ions to enter or intercalate into the bulk of anode active material particles during re-charge, and into the bulk of cathode active material particles during discharge. For instance, as illustrated in FIG. 1(A), in a most commonly used lithium-ion battery featuring graphite particles as an anode active material, lithium ions are required to diffuse into the inter-planar spaces of a graphite crystal at the anode during re-charge. Most of these lithium ions have to come all the way from the cathode side by diffusing out of the bulk of a cathode active particle, through the pores of a solid separator (pores being filled with a liquid electrolyte), and into the bulk of a graphite particle at the anode.

During discharge, lithium ions diffuse out of the anode active material (e.g. de-intercalate out of graphite particles), migrate through the liquid electrolyte phase, and then diffuse into the bulk of complex cathode crystals (e.g. intercalate into particles lithium cobalt oxide, lithium iron phosphate, or other lithium insertion compound). In other words, liquid electrolyte only reaches the external surface of a solid particle (e.g. graphite particle 10 μm in diameter) and lithium ions swimming in the liquid electrolyte can only migrate (via fast liquid-state diffusion) to the graphite surface. To penetrate into the bulk of a solid graphite particle would require a slow solid-state diffusion (commonly referred to as "intercalation") of lithium ions. The diffusion coefficients of lithium in solid particles of lithium metal oxide are typically $10^{-16}$-$10^{-8}$ cm$^2$/sec (more typically $10^{-14}$-$10^{-10}$ cm$^2$/sec), and those of lithium in liquid are approximately $10^{-6}$ cm$^2$/sec.

In other words, these intercalation or solid-state diffusion processes require a long time to accomplish because solid-state diffusion (or diffusion inside a solid) is difficult and slow. This is why, for instance, the current lithium-ion battery for plug-in hybrid vehicles requires 2-7 hours of recharge time, as opposed to just seconds for supercapacitors. The above discussion suggests that an energy storage device that is capable of storing as much energy as in a battery and yet can be fully recharged in one or two minutes like a supercapacitor would be considered a revolutionary advancement in energy storage technology.

More Recent Developments

Recently, multi-walled carbon nano-tubes (CNTs) containing carbonyl groups were used by Lee, et al as a cathode material for a lithium-ion capacitor (LIC) containing lithium titanate as the anode material [S. W. Lee, et al, "High Power Lithium Batteries from Functionalized Carbon Nanotubes," Nature Nanotechnology, 5 (2010) 531-537]. In a half-cell configuration, lithium foil was used as the anode and functionalized CNTs as the cathode, providing a relatively high power density. However, the CNT-based electrodes prepared by the layer-by-layer (LBL) approach suffer from several technical issues beyond just the high costs. Some of these issues are:

(1) CNTs are known to contain a significant amount of impurity, particularly those transition metal or noble metal particles used as a catalyst required of a chemical vapor deposition process. These catalytic materials are highly undesirable in a battery electrode due to their high propensity to cause harmful reactions with electrolyte.

(2) CNTs tend to form a tangled mass resembling a hair-ball, which is difficult to work with during electrode fabrication (e.g., difficult to disperse in a liquid solvent or resin matrix).

(3) The so-called "layer-by-layer" approach (LBL) used by Lee, et al is a slow and expensive process that is not amenable to large-scale fabrication of battery electrodes, or mass production of electrodes with an adequate thickness (most of the batteries have an electrode thickness of 100-300 μm). The thickness of the LBL electrodes produced by Lee, et al (a noted MIT research group) was limited to 3 μm or less.

(4) One might wonder how the thickness of the LBL CNT electrodes would impact their performance. A careful inspection of the data provided by Lee, et al (e.g. FIG. S-7 of the Supporting Material of Lee, et al) show that the power density dropped by one order of magnitude when the LBL CNT electrode thickness was increased from 0.3 μm to 3.0 μm. The performance is likely to drop even further if the electrode thickness is increased to that of a useful battery or supercapacitor electrode (e.g., 100-300 μm).

(5) Although the ultra-thin LBL CNT electrodes provide a high power density (since Li ions only have to travel an extremely short distance), there was no data to prove that CNT-based electrodes of practical thickness could even work due to the poor CNT dispersion and electrolyte inaccesability issues. Lee, et al showed that the CNT-based composite electrodes prepared without using the LBL approach did not exhibit good performance.

(6) CNTs have very limited amounts of suitable sites to accept a functional group without damaging the basal plane structure. A CNT has only one end that is readily functionalizable and this end is an extremely small proportion of the total CNT surface. By chemically functionalizing the exterior basal plane, one could dramatically compromise the electronic conductivity of a CNT.

Most recently, our research groups have reported, in two patent applications, the development of two new classes of highly conducting cathode active materials having a functional group that is capable of rapidly and reversibly forming a redox reaction with lithium ions. These materials are nano graphene (both single-layer graphene and multi-layer graphene sheets, collectively referred to as nano graphene platelets or NGPs) and disordered carbon (including soft carbon, hard carbon, carbon black, activated carbon, amorphous carbon, etc). These two patent applications are: C. G. Liu, et al., "Lithium Super-battery with a Functionalized Nano Graphene Cathode," U.S. patent application Ser. No. 12/806,679 (Aug. 19, 2010) and C. G. Liu, et al, "Lithium Super-battery with a Functionalized Disordered Carbon Cathode," U.S. patent application Ser. No. 12/924,211 (Sep. 23, 2010).

These new types of cathode active materials (used in the so-called "lithium super-battery") include a chemically functionalized nano graphene platelet (NGP) or a functionalized disordered carbon material having certain specific functional groups capable of reversibly and rapidly forming a redox pair with a lithium ion during the charge and discharge cycles of a battery cell. In these two patent applications, the functionalized disordered carbon or functionalized NGP is used in the cathode (not the anode) of the lithium super-battery. In this cathode, lithium ions in the liquid electrolyte only have to migrate to the edges or surfaces of graphene sheets (in the case of functionalized NGP cathode), or the edges/surfaces of the aromatic ring structures (small graphene sheets) in a disordered carbon matrix. No solid-state diffusion is required at the cathode. The presence of a functionalized graphene or carbon having functional groups thereon enables reversible storage of lithium on the surfaces (including edges), not the bulk, of the cathode material. Such a cathode material provides one type of lithium-storing or lithium-capturing surface.

In conventional lithium-ion batteries, lithium ions must diffuse into and out of the bulk of a cathode active material, such as lithium cobalt oxide (LiCoO$_2$) and lithium iron phosphate (LiFePO$_4$). In these conventional lithium-ion batteries, lithium ions must also diffuse in and out of the inter-planar spaces in a graphite crystal serving as an anode active material. The lithium insertion or extraction procedures at both the cathode and the anode are very slow. Due to these slow processes of lithium diffusion in and out of these intercalation compounds (commonly referred to as solid-state diffusion or intercalation processes), the conventional lithium ion batteries do not exhibit a high power density and the batteries require a long re-charge time. None of these conventional devices rely on select functional groups (e.g. attached at the edge or basal plane surfaces of a graphene sheet) that readily and reversibly form a redox reaction with a lithium ion from a lithium-containing electrolyte.

In contrast, the super-battery as reported in our two earlier patent applications (U.S. application Ser. No. 12/806,679 and Ser. No. 12/924,211), relies on the operation of a fast and reversible reaction between a functional group (attached or bonded to a graphene structure at the cathode) and a lithium ion in the electrolyte. Lithium ions coming from the anode side through a separator only have to diffuse in the liquid electrolyte residing in the cathode to reach a surface/edge of a graphene plane. These lithium ions do not need to diffuse into or out of the volume of a solid particle. Since no diffusion-limited intercalation is involved at the cathode, this process is fast and can occur in seconds. Hence, this is a totally new class of hybrid supercapacitor-battery that exhibits unparalleled and unprecedented combined performance of an exceptional power density, high energy density, long and stable cycle life, and wide operating temperature range. This device has the best of both battery and supercapacitor worlds.

In the lithium super-batteries described in these two patent applications, the anode comprises either particles of a lithium titanate-type anode active material (still requiring solid state diffusion), schematically illustrated in FIG. 1(B), or a lithium foil alone (without a nano-structured material to support or capture lithium ions/atoms), illustrated in FIG. 1(C). In the latter case, lithium has to deposit onto the front surface of an anode current collector alone (e.g. copper foil) when the battery is re-charged. Since the specific surface area of a current collector is very low (typically <<1 $m^2$/gram), the over-all lithium re-deposition rate is relatively low (this issue is being overcome in the instant invention).

In another co-pending application [Aruna Zhamu, C. G. Liu, David Neff, and Bor Z. Jang, "Surface-Controlled Lithium Ion-Exchanging Energy Storage Device," U.S. patent application Ser. No. 12/928,927 (Dec. 23, 2010)], we reported another superior energy storage device that also operates on lithium ion exchange between the cathode and the anode. However, in this new device, both the cathode and the anode (not just the cathode) have a lithium-capturing or lithium-storing functional surface (typically having a functional group to reversibly react with lithium) and both electrodes (not just the cathode) obviate the need to engage in solid-state diffusion. This is illustrated in FIG. 1(D) and FIG. 2. Both the anode and the cathode have large amounts of surface areas to allow lithium ions to deposit thereon simultaneously, enabling dramatically higher charge and discharge rates and higher power densities. The uniform dispersion of these surfaces of a nano-structured material (e.g. graphene, CNT, disordered carbon, nano-wire, and nano-fiber) in an electrode also provides a more uniform electric field in the electrode in which lithium can more uniformly deposit without forming a dendrite. Such a nano-structure eliminates the potential formation of dendrites, which was the most serious problem in conventional lithium metal batteries (commonly used in 1980s and early 1990s before being replaced by lithium-ion batteries). Such a device is herein referred to as a surface-controlled, lithium ion-exchanging battery.

The instant application, claiming the benefits of the co-pending U.S. application Ser. No. 12/928,927, discloses a more general and versatile approach that also involves the exchange of massive lithium ions between the surfaces of an anode and the surfaces of a cathode; but, these surfaces in the instant application do not have to be a functional material bearing any functional group capable of forming a redox pair with lithium. Instead, we have most surprisingly observed that, without any functional group, some graphene surfaces are fully capable of capturing or trapping more lithium atoms. Regardless if the surfaces contain functional groups or not, graphene surfaces are capable of storing lithium atoms in a stable and reversible manner, provided these surfaces are accessible to lithium ion-containing electrolyte and are in direct contact with the electrolyte. After extensive in-depth studies, we have further observed that the lithium storing capacity is in direct proportion to the total surface area that is directly exposed to the lithium ion-containing electrolyte, as indicated in FIG. 13. For instance, the data point with the highest specific capacity in FIG. 13 was for the cell containing a graphene electrode composed of essentially all carbon atoms only (>98% C), no functional group such as —OH or —COOH. Hence, the mechanism of Li-functional group redox reaction could not be the dominant lithium storage mechanism. The co-pending U.S. application Ser. No. 12/928,927 claims the functional material-based surface-mediated cell (SMC), but the instant application claims the SMC based on a non-functional material electrode.

SUMMARY OF THE INVENTION

For the purpose of defining the scope of the claims in the instant application, the surface-mediated cell (SMC) does not include any lithium-air (lithium-oxygen) cell, lithium-sulfur cell, or any cell wherein the operation of the energy storage device involves the introduction of oxygen from outside of the device, or involves the formation of a metal oxide, metal sulfide, metal selenide, metal telluride, metal hydroxide, or metal-halogen compound at the cathode. These cells involve a strong cathode reaction during cell discharge and, hence, the re-charge reaction is not very reversible (having very low round-trip efficiency) and/or extremely poor power density.

The present invention provides a surface-mediated, lithium ion-exchanging energy storage device (SMC) comprising: (a) A positive electrode (cathode) comprising a cathode active material having a surface area to capture or store lithium thereon; (b) A negative electrode (anode) comprising an anode active material having a surface area to capture or store lithium thereon; (c) A porous separator disposed between the two electrodes; and (d) A lithium-containing electrolyte in physical contact with the two electrodes, wherein the anode active material and/or the cathode active material has a specific surface area of no less than 100 $m^2$/g being in direct physical contact with the electrolyte to receive lithium ions therefrom or to provide lithium ions thereto; wherein at least one of the two electrodes contains therein a lithium source prior to a first charge or a first discharge cycle of the energy storage device, and at least the cathode active material is not a functional material (i.e. this material bears no functional group capable of reacting with Li). The lithium source may be preferably in a form of solid lithium foil, lithium chip, lithium powder, or surface-stabilized lithium particles. The lithium source may be a layer of lithium thin film pre-loaded on surfaces of an anode active material.

The surfaces of an SMC electrode material (e.g., pristine graphene containing essentially >99% carbon), despite having no functional groups bonded thereon, are capable of capturing lithium ions directly from a liquid electrolyte phase and storing lithium atoms on the surfaces in a reversible and stable manner, even though this mono-layer of lithium atoms remains immersed in electrolyte. Scientifically this has been quite unexpected since one would expect the liquid electrolyte to be more competitive than bare graphene surfaces for retaining or capturing lithium.

The electrolyte preferably comprises liquid electrolyte (e.g. organic liquid or ionic liquid) or gel electrolyte in which lithium ions have a high diffusion coefficient. Solid electrolyte is normally not desirable, but some thin layer of solid electrolyte may be used if it exhibits a relatively high diffusion rate.

To illustrate the operational principle of this new battery device (FIG. 2(A)), one may consider a case wherein a lithium source (e.g. small pieces of lithium foil) is implemented between a nano-structured anode (e.g. comprising non-functionalized graphene sheets) and a porous polymer separator when the battery device is made, and wherein a nano-structured cathode comprises non-functionalized graphene sheets surrounded by interconnected pores that are preferably meso-scaled (2 nm-50 nm), but can be smaller than 2 nm. Referring to FIG. 2(A)-(C), during the first discharge cycle, lithium foil is ionized to generate lithium ions in the liquid electrolyte. Lithium ions rapidly migrate through the pores of the polymer separator into the cathode side. Since the cathode is also meso-porous having interconnected pores to accommodate liquid electrolyte therein, lithium ions basically just have to sail through liquid to reach an active site (not a functional group) on a surface or edge of a graphene sheet at the cathode. The graphene surface is in direct contact with electrolyte and readily accepts lithium ions from the electrolyte. Because all the steps (lithium ionization, liquid phase diffusion, and surface trapping/adsoption/capturing) are fast and no solid-state diffusion is required, the whole process is very fast, enabling fast discharging of the SMC and a high power density. This is in stark contrast to the conventional lithium-ion battery wherein lithium ions are required to diffuse into the bulk of a solid cathode particle (e.g., micron-sized lithium cobalt oxide) during discharge, which is a very slow process. During discharge of the lithium-ion battery, these lithium ions have to come out of the bulk of graphite particles at the anode. Since liquid electrolytes only reaches the surfaces of these micron-scaled graphite particles (not in direct contact with the graphene surfaces inside the graphite particle), the lithium de-intercalation step also require a slow solid-state diffusion.

In the above example, the discharge process continues until either the lithium foil is completely ionized or all the active sites on the cathode active materials are occupied by lithium atoms. During re-charge, lithium ions are released from the massive surfaces of the cathode active material (having no functional material attached thereon), diffuse through liquid electrolyte, and get captured by the surfaces of an anode active material (e.g. simply get electrochemically deposited on a surface of the nano-structured anode material). Again, no solid-state diffusion is required and, hence, the whole process is very fast, requiring a short re-charge time. This is as opposed to the required solid-state diffusion of lithium ions into the bulk of graphite particles at the anode of a conventional lithium-ion battery.

Clearly, the presently invented battery device provides a very unique platform of exchanging lithium ions between the massive surfaces of an anode and the massive surfaces of a cathode that requires no solid-state diffusion in both electrodes. The process is substantially dictated by the surface-capturing of lithium, plus the liquid-phase diffusion (all being very fast). Hence, the device is herein referred to as a surface-mediated, lithium ion-exchanging battery. This is a totally different and patently distinct class of energy storage device than the conventional lithium-ion battery, wherein solid-state diffusion of lithium (intercalation and de-intercalation) is required at both the anode and the cathode during both the charge and discharge cycles.

This new surface-mediated, lithium ion-exchanging battery device is also patently distinct from the conventional supercapacitor based on the electric double layer (EDL) mechanism or pseudo-capacitance mechanism. In both mechanisms, no lithium ions are exchanged between the two electrodes (since lithium is not stored in the bulk or surfaces of the electrode; instead, they are stored in the electric double layers near the electrode surfaces). When a supercapacitor is re-charged, the electric double layers are formed near the activated carbon surfaces at both the anode and the cathode sides. Each and every EDL is composed of a layer of negatively charged species and a layer of positively charged species in the electrolyte (in addition to the charges on surfaces of the electrode material (e.g. activated carbon). When the supercapacitor is discharged, both the negatively charged species and the positively charged species get randomized in the electrolyte (staying further away from electrode material surfaces). In contrast, when a SMC is re-charged, essentially all of the lithium ions are electro-plated onto the surfaces of the anode active material and the cathode side is essentially lithium-free. When the SMC is discharged, essentially all the lithium ions are captured by the cathode active material surfaces (stored in the defects or bonded to the benzene ring centers). Very little lithium stays in the electrolyte.

More significantly, all the prior art supercapacitors do not contain an extra lithium source and do not involve ionization of lithium from this lithium source. The charge storage capacitance of a supercapacitor (even when using a Li-containing electrolyte) is limited by the amounts of cations and anions that participate in the formation of EDL charges. These amounts are dictated by the original concentration of $Li^+$ ions and their counter ions (anions) from a lithium salt, which are in turn dictated by the solubility limits of these ions in the electrolyte solvent. To illustrate this point, let us assume that only up to 1 mole of $Li^+$ ions can be dissolved in 1 mL of a solvent and there are totally 5 mL of solvent added to a particular supercapacitor cell, Then, there is a maximum of 5 moles of $Li^+$ ions that can be present in the total cell and this amount dictates the maximum amount of charges that can be stored in this supercapacitor.

In contrast (and quite surprisingly), the amounts of lithium ions that can be shuttled between the anode surface and the cathode surface of a SMC are not limited by the chemical solubility of lithium salt in this same solvent. Assume that an identical 5 mL of solvent (containing 5 moles of $Li^+$ ions, as described above for a supercapacitor) is used in the SMC. Since the solvent is already fully saturated with the lithium salt, one would expect that this solvent cannot and will not accept any more $Li^+$ ions from an extra lithium source (5 moles being the maximum). Consequently, one would expect that these 5 moles of $Li^+$ ions are the maximum amount of lithium that we can use to store charges (i.e., the maximum amount of $Li^+$ ions that can be captured by the cathode during discharge, or the maximum amount of $Li^+$ ions that can be captured by the anode during re-charge). Contrary to this expectation by a person of ordinary or even extra-ordinary skill in the art of electrochemistry, we have surprisingly discovered that the amount of $Li^+$ ions that can be captured by the surfaces of either electrode (or, the amount of $Li^+$ ions that can be shuttled between the two electrodes) in a SMC typically far exceeds this solubility limit by 1 or 2 orders of magnitude. The implementation of a lithium source at the anode appears to have defied this expectation by providing dramatically more lithium ions than what the solvent can dissolve therein.

Further surprisingly, in a SMC, the amount of lithium capable of contributing to the charge storage is controlled (limited) by the amount of surface active sites of a cathode capable of capturing lithium ions from the electrolyte. This is so even when this amount of surface active sites far exceeds the amount of $Li^+$ ions that the solvent can hold at one time (e.g. 5 moles in the present discussion), provided that the implemented lithium source can provide the extra amount lithium ions. These active sites can be just the surface defects of graphene, or the benzene ring centers on a graphene plane (FIGS. 3(D) and (E)). Also quite unexpectedly, lithium atoms are found to be capable of strongly and reversibly bonding to the individual centers of benzene rings (hexagons of carbon atoms) that constitute a graphene sheet, or of being reversibly trapped by graphene surface defect sites.

The presently invented surface-mediated, lithium ion-exchanging battery device is also patently distinct from the super-battery as disclosed in two of our earlier applications (U.S. application Ser. No. 12/806,679 and Ser. No. 12/924,211), which does not have an anode active material at the anode (The anode side only contains an anode current collector). In the presently invented energy storage device, not only the cathode but also the anode has large amounts of surface areas to allow lithium ions to deposit thereon simultaneously, enabling dramatically higher charge and discharge rates and higher power densities. In other words, in a high current density situation (during fast re-charging), great amounts of lithium ions rapidly swarm into the anode side, with each lithium ion looking for a site to deposit onto. The anode current collector alone (e.g. Cu foil) has only a small amount of surface area available at one time, incapable of accommodating such a high flux of lithium ions. By contrast, the large specific surface area of a nano-structured anode material (e.g., graphene or CNT) is capable of accommodating a huge amount of lithium ions at the same time. In addition, the uniform dispersion of these surfaces of a nano material (e.g. graphene or CNT) in an electrode also provides a more uniform electric field in the electrode in which lithium can more uniformly deposit without forming a dendrite. More surface areas also mean more deposition spots and each spot only has a small quantity of lithium, insufficient to form a dangerous dendrite. Such a nano-structure eliminates the potential formation of dendrites, which was the most serious problem in conventional lithium metal batteries.

In this SMC device, preferably at least the cathode of the two electrodes has a cathode active material that is not a functionalized material (i.e., having no functional group attached to its surface that is exposed to electrolyte). The functionalized material means a material having a functional group (e.g., carbonyl) that is capable of reacting with a lithium atom or ion to form a redox pair. The cathode active material has a high specific surface area (>100 $m^2/g$) that is in direct contact with the electrolyte (e.g. being directly immersed in electrolyte) and capable of capturing lithium ions from the electrolyte and storing the lithium atoms in the surface active sites (e.g. surface defects and benzene ring centers).

Preferably, both of the two electrodes have a high specific surface area (>100 $m^2/g$) that is in direct contact with the electrolyte and capable of capturing/storing lithium atoms/ions in their surface active sites. Preferably, at least one of the two electrodes has a nano-structured non-functional material having a high specific surface area no less than 500 $m^2/gram$ (preferably >1,000 $m^2/gram$, more preferably >1,500 $m^2/gram$, and most preferably >2,000 $m^2/gram$) to store or support lithium ions or atoms thereon.

Preferably, the lithium source comprises a lithium chip, lithium foil, lithium powder, surface-passivated or stabilized lithium particles, or a combination thereof. The lithium source may be implemented at the anode side before the first discharge procedure is carried out on this battery device. Alternatively, the lithium source may be implemented at the cathode side before the first charge procedure is carried out on this battery device. As another alternative, both the cathode and the anode may be fabricated to contain some lithium source during the battery manufacturing process. It is important to note that this solid lithium source provides the majority of the lithium ions that are to be exchanged between the anode surfaces and the cathode surfaces during the charge-discharge cycles. Although the lithium-containing electrolyte naturally provides some of the needed lithium ions, this amount is way too short to enable the battery device to deliver a high energy density. This is why any symmetric supercapacitor, even if containing Li-based electrolyte, does not exhibit a high energy density.

In the presently invented SMC battery device, at least one of the anode active material and the cathode active material (preferably both) is (are) selected from the following:
  (a) A porous disordered carbon material selected from a soft carbon, hard carbon, polymeric carbon or carbonized resin, meso-phase carbon, coke, carbonized pitch, carbon black, activated carbon, or partially graphitized carbon;
  (b) A graphene material selected from a single-layer sheet or multi-layer platelet of graphene, graphene oxide, graphene fluoride, hydrogenated graphene, nitrogenated graphene, boron-doped graphene, nitrogen-doped graphene, or chemically or thermally reduced graphene oxide;
  (c) Exfoliated graphite;
  (d) Meso-porous carbon (e.g. obtained by template-assisted synthesis or chemical activation of meso-phase carbon);
  (e) A carbon nanotube selected from a single-walled carbon nanotube or multi-walled carbon nanotube;
  (f) A carbon nano-fiber, metal nano-wire, metal oxide nano-wire or fiber, or conductive polymer nano-fiber, or
  (g) A combination thereof.

Although CNTs are not preferred nano-structured materials due to the high costs and other technical issues, CNTs (alone or in combination with another nano-structured material) can still be used in the presently invented surface-controlled lithium ion-exchanging battery.

Alternatively, a nano-structured carbon material, such as non-functionalized nano graphene, carbon nanotube, disordered carbon, or nano graphite, may simply provide a surface upon which lithium atoms can be deposited, e.g. via defect site trapping or benzene ring center capturing. The mere existence of a nano-structured material, even without a reactive functional group, can still provide a huge amount of lithium-storing surfaces. This non-functionalized surface is the lithium-storing surface in the present application.

The disordered carbon material may be formed of two phases with a first phase being graphite crystals or stacks of graphene planes and a second phase being non-crystalline carbon and wherein the first phase is dispersed in the second phase or bonded by the second phase. The disordered carbon material may contain less than 90% by volume of graphite crystals and at least 10% by volume of non-crystalline carbon.

The anode or cathode active materials of a SMC may comprise non-functionalized nano graphene selected from a single-layer graphene sheet or a multi-layer graphene platelet. Alternatively, the active materials may comprise single-walled or multi-walled carbon nanotube.

Thus, in a preferred embodiment of the present invention, the anode active material and/or the cathode active material of a SMC is a non-functionalized graphene material selected from a single-layer sheet or multi-layer platelet of graphene, graphene oxide, graphene fluoride, hydrogenated graphene, nitrogenated graphene, boron-doped graphene, nitrogen-doped graphene, doped graphene, or chemically or thermally reduced graphene oxide. Alternatively, the anode active material and/or the cathode active material is a non-functionalized single-walled or multi-walled carbon nanotube (CNT), oxidized CNT, fluorinated CNT, hydrogenated CNT, nitrogenated CNT, boron-doped CNT, nitrogen-doped CNT, or doped CNT.

The lithium source may be selected from lithium metal (e.g., in a thin foil or powder form, preferably stabilized or surface-passivated), a lithium metal alloy, a mixture of lithium metal or lithium alloy with a lithium intercalation compound, a lithiated compound, lithiated titanium dioxide, lithium titanate, lithium manganate, a lithium transition metal oxide, $Li_4Ti_5O_{12}$, or a combination thereof. Specifically, the lithium intercalation compound or lithiated compound may be selected from the following groups of materials:

(a) Lithiated silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof;
(b) Lithiated alloys or intermetallic compounds of Si, Ge, Sn, Pb, Sb, Bi, Zn, Al, Ti, Co, Ni, Mn, Cd, and their mixtures;
(c) Lithiated oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof, and
(d) Lithiated salts or hydroxides of Sn.

The electrolyte may be preferably selected from any of the electrolytes used in conventional lithium ion batteries or lithium metal batteries. The electrolyte is preferably liquid electrolyte or gel electrolyte. The electrolyte may comprise a lithium salt-doped ionic liquid. In the battery device, the positive electrode preferably has a thickness greater than 5 μm, preferably greater than 50 μm, and more preferably greater than 100 μm.

In a preferred embodiment, in the SMC, at least 90% of the lithium is stored on surfaces of the anode active material (lithium being in direct physical contact with anode surfaces) when the device is in a charged state, or at least 90% of the lithium is stored on surfaces of the cathode active material (lithium being in direct physical contact with cathode surfaces) when the device is in a discharged state.

The SMC typically operates in a voltage range of from 1.0 volts to 4.5 volts, but can be prescribed to operate in a subset of this range (e.g. from 1.5 volts to 4.0 volts or from 2.0 volts to 3.9 volts, etc). It is also possible to operate above 4.5 volts, or slightly below 1.0 volts (not preferred). It may be noted that a symmetric supercapacitor featuring an organic electrolyte can only operates up to 3.0 volts and typically operates from 0 to 2.7 volts. In contrast, a SMC using exactly the same organic electrolyte typically operates from 1.5 volts to 4.5 volts. This is another piece of evidence that the SMC and the supercapacitor are two fundamentally distinct classes of energy storage devices, operating on different mechanisms and principles.

Preferably, the charge and/or discharge operation of the SMC does not involve lithium intercalation or solid state diffusion. This is usually the case even if multi-layer graphene platelets are used in either the anode or the cathode. Lithium intercalation into interstitial spaces between two graphene planes typically occur in a voltage below 1.5 volts (relative to $Li/Li^+$), mostly below 0.3 volts. The presently invented lithium ion-exchanging cell involves shuttling lithium ions between the surfaces of an anode and surfaces of a cathode, which operates on the range of 1.5 volts to 4.5 volts.

Quite surprisingly, the SMC device provides an energy density typically of no less than 150 Wh/kg and power density no lower than 25 Kw/kg, all based on the total electrode weight. More typically, the battery device provides an energy density of greater than 300 Wh/kg and power density greater than 20 Kw/kg. In many cases, the battery device provides an energy density greater than 400 Wh/kg and power density greater than 10 Kw/kg. Most typically, the battery device provides an energy density greater than 300 Wh/kg or a power density greater than 100 Kw/kg. In some cases, the power density is significantly higher than 200 Kw/kg, or even higher than 400 Kw/kg, which is 1-3 orders of magnitude higher than the power densities (1-10 Kw/kg) of conventional supercapacitors.

In the SMC, the positive electrode preferably has a thickness greater than 5 μm, more preferably greater than 50 μm, and most preferably greater than 100 μm.

The present invention also provides a method of operating the energy storage device (SMC). The method includes implementing a lithium source at the anode and ionizing the lithium source to release lithium ions into the electrolyte during the first discharge cycle of the device. The method further includes electrochemically driving the released lithium ions onto the cathode where the released lithium ions are captured by the cathode active material surfaces. The method can further include a step of releasing lithium ions from said cathode surfaces during a re-charge cycle of said device, electrically driving said released lithium ions to said anode active material surfaces using an external battery charging device.

Alternatively, the method may include implementing a lithium source at the cathode and operating the lithium source to release lithium ions into the electrolyte during the first charge cycle of the device.

The invention further provides a method of operating a surface-mediated energy storage device, which method includes: (A) Providing a surface-mediated cell comprising an anode, a lithium source, a porous separator, liquid or gel electrolyte, and a cathode, wherein both the anode and the cathode have a non-functionalized material having lithium-capturing surfaces; (B) Releasing lithium ions from the lithium source during the first discharge of the device; (C) Exchanging lithium ions between the lithium-capturing surfaces of the anode and the lithium-capturing surfaces of the cathode during a subsequent charge or discharge. Preferably, both the charge and discharge of the device do not involve lithium intercalation or solid state diffusion.

The instant application discloses another method of operating a surface-mediated energy storage device. The method includes: (A) Providing a surface-mediated cell comprising an anode, a lithium source, a porous separator, electrolyte (having an initial amount of lithium ions), and a cathode, wherein both the anode and the cathode have a material having lithium-capturing surfaces in contact with the electrolyte; (B) Releasing lithium ions from the lithium source into the electrolyte during the first discharge of this device; (C) Operating the cathode to capture lithium ions from the electrolyte and store the captured lithium on cathode surfaces (preferably having a specific surface area of greater than 100 $m^2/g$, more preferably greater than 1,000 $m^2/g$, and most preferably greater than 2,000 $m^2/g$); and (D) Exchanging an amount of lithium ions (greater than the initial amount) between the lithium-capturing surfaces of the anode and the lithium-capturing surfaces of the cathode during a subsequent charge or discharge operation, wherein the charge operation involves no lithium intercalation.

DESCRIPTION OF THE PREFERRED EMBODIMENTS

Figure 1:
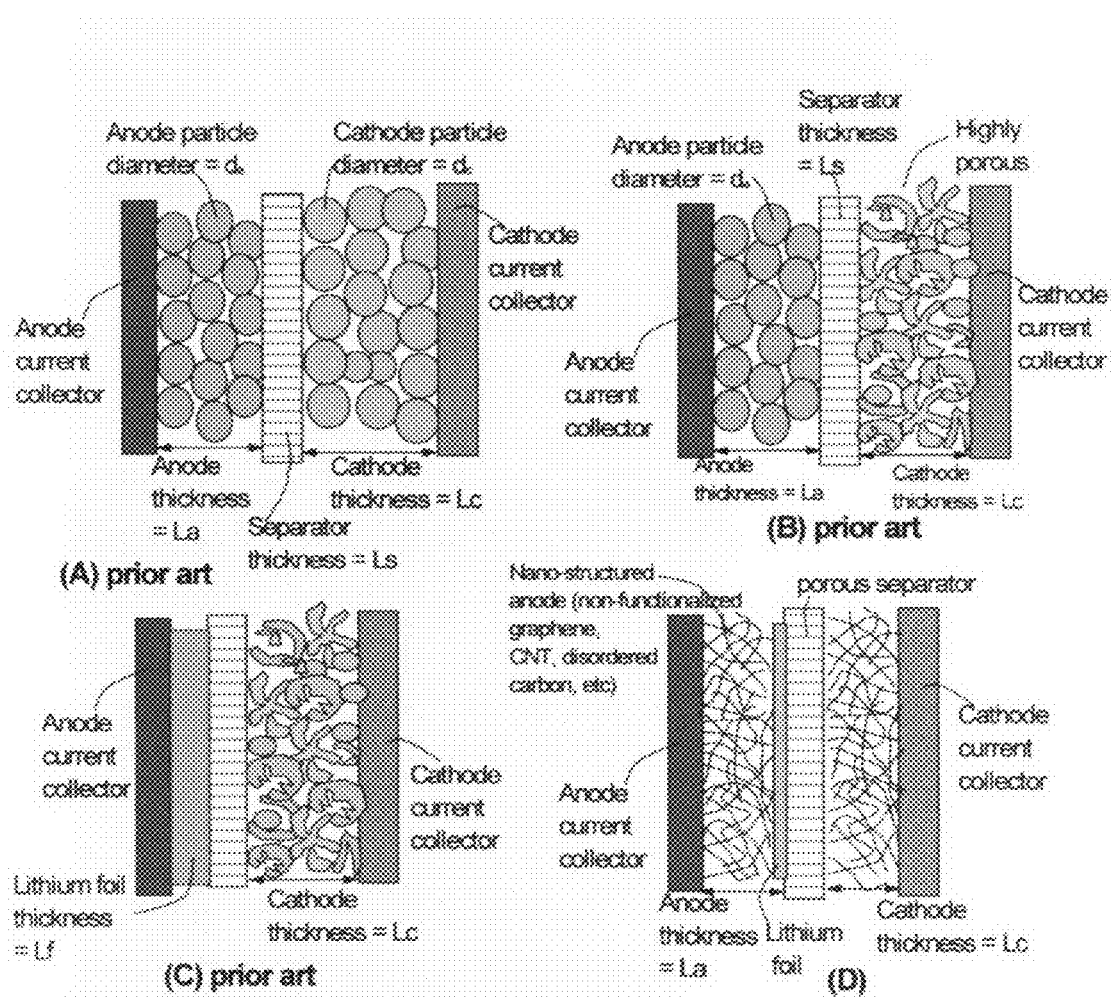
FIG. 1 (A) a prior art lithium-ion battery cell using graphite, Si, or lithium titanate as an anode active material and lithium iron phosphate (or lithium cobalt oxide, etc) as a cathode active material; (B) a prior art lithium super-battery cell with a lithium titanate as an anode active material and a cathode made of a functional material (e.g., functionalized nano graphene, CNT, or disordered carbon powder); (C) a prior art lithium super-battery cell with a lithium foil anode (but no nano-structured functional material) and a cathode made of functionalized graphene, CNT, or disordered carbon; (D) an example of the presently invented surface-mediated, lithium ion-exchanging battery device, which contains a nano-structured non-functionalized material (with a functional group capable of reacting with lithium ions or atoms) at the anode, a lithium source (e.g. lithium foil or surface-passivated lithium powder), a porous separator, liquid or gel electrolyte (liquid being preferred), a nano-structured functional material at the cathode.

The present invention may be more readily understood by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting the claimed invention.

This invention provides an electrochemical energy storage device that is herein referred to as a surface-mediated, lithium ion-exchanging cell (or simply surface-mediated cell, SMC). This SMC device exhibits a power density significantly higher than the power densities of conventional supercapacitors and dramatically higher than those of conventional lithium ion batteries. This device exhibits an energy density comparable to that of a battery, and significantly higher than those of conventional supercapacitors.

This surface-mediated, ion-exchanging battery is composed of a positive electrode containing a non-functionalized material having a lithium-storing or lithium-capturing surface (the non-functionalized material being preferably nano-structured with nano-scaled or meso-scaled pores and great amounts of surface areas containing no chemical functional group, like —$NH_2$ or —COOH, to form a redox pair with a lithium), a negative electrode containing a high surface area material having a lithium-storing or lithium-capturing surface (preferably nano-structured with nano-scaled or meso-scaled pores), a porous separator disposed between the two electrodes, a lithium-containing electrolyte in physical contact with the two electrodes, and a lithium ion source implemented at the anode or the cathode. These lithium-capturing surfaces are in direct contact with electrolyte to capture lithium ions therefrom or to release lithium ions thereto. Preferred electrolyte types include organic liquid electrolyte, gel electrolyte, and ionic liquid electrolyte (preferably containing lithium ions), or a combination thereof, although one may choose to use aqueous or solid electrolytes.

The lithium ion source can be selected from a lithium chip, lithium foil, lithium powder, surface stabilized lithium particles, lithium film coated on a surface of an anode or cathode active material, or a combination thereof. In one preferred embodiment, the anode active material is prelithiated, or pre-coated or pre-plated with lithium. In addition to relatively pure lithium metal, the lithium source may be selected from a lithium metal alloy, a mixture of lithium metal or lithium alloy with a lithium intercalation compound, a lithiated compound, lithiated titanium dioxide, lithium titanate, lithium manganate, a lithium transition metal oxide, $Li_4Ti_5O_{12}$, or a combination thereof. The lithium intercalation compound or lithiated compound may be selected from the following groups of materials: (a) Lithiated silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof; (b) Lithiated alloys or intermetallic compounds of Si, Ge, Sn, Pb, Sb, Bi, Zn, Al, Ti, Co, Ni, Mn, Cd, and their mixtures; (c) Lithiated oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof, or (d) Lithiated salts or hydroxides of Sn.

Although there is no limitation on the electrode thickness, the presently invented positive electrode preferably has a thickness greater than 5 μm, more preferably greater than 50 μm, and most preferably greater than 100 μm. An example of such a surface-mediated, ion-exchanging battery device is given in FIG. 1(D) and FIG. 2.

Theoretical Aspects (Lithium Ion Diffusion Kinetics of Conventional Lithium-Ion Batteries, Super-Batteries, and the New Surface-Controlled, Ion-Exchanging Battery Device)

Not wishing to be constrained by any theory, but we would like to offer the following theoretical considerations that perhaps are helpful to the readers. We will provide some insight as to how a surface-mediated energy storage device operates and why such a lithium ion-exchanging battery exhibits exceptional power densities un-matched by conventional supercapacitors and the already impressive super-batteries disclosed earlier by us. We will also shed some light on why the electrode thickness of a lithium cell (including the surface-mediated lithium ion-exchanging cell, partially surface-mediated lithium super-battery, and conventional lithium-ion battery) plays such a critical role in dictating the power density in such a dramatic manner.

Figure 2:
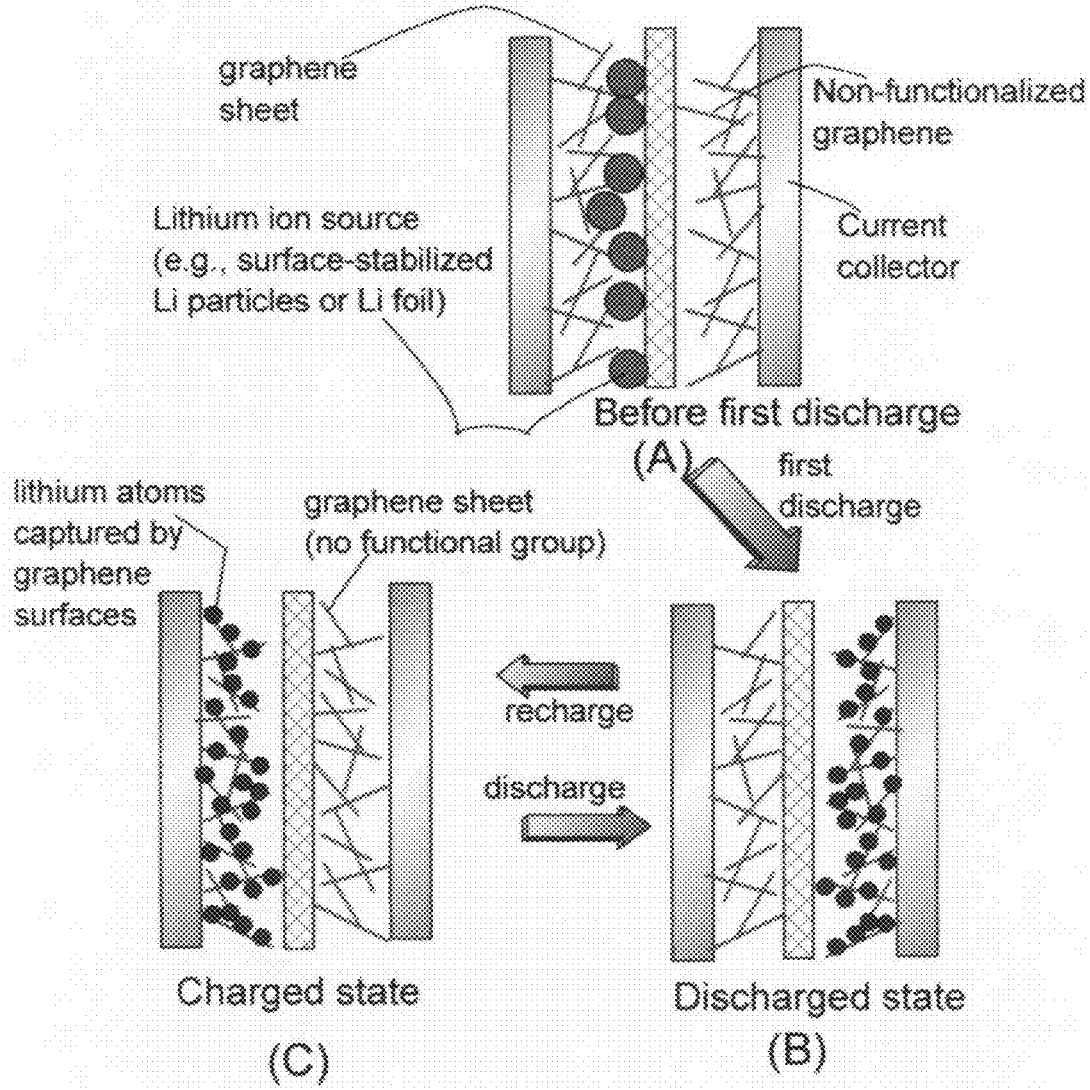
FIG. 2 (A) The structure of a surface-mediated, lithium ion-exchanging battery device when it is made (prior to the first discharge or charge cycle), containing a nano-structured material at the anode, a lithium source (e.g. lithium foil or surface-stabilized lithium powder), a porous separator, liquid electrolyte, a nano-structured non-functionalized material at the cathode; (B) The structure of this battery device after its first discharge operation (lithium is ionized with the lithium ions diffusing through liquid electrolyte to reach the surfaces of nano-structured cathode and get rapidly captured by these surfaces); (C) The structure of this battery device after being re-charged (lithium ions are released from the cathode surfaces, diffusing through liquid electrolyte to reach the surfaces of the nano-structured anode and get rapidly plated onto these surfaces). The huge surface areas can serve as a supporting substrate onto which massive amounts of lithium ions can electro-deposit concurrently. Such a massive, simultaneous deposition cannot be accomplished with the anode current collector alone which has a low specific surface area.

The internal structure of a conventional lithium-ion battery may be schematically shown in FIG. 1(A). In a battery discharge situation, lithium ions must diffuse (de-intercalate) out from the bulk of an anode active material particle, such as graphite, silicon, and lithium titanate (particle diameter=$d_a$ and the average solid-state diffusion distance=$d_a/2$), and then migrate in liquid electrolyte across the anode thickness (anode layer thickness=La and the average diffusion distance=La/2). Subsequently, lithium ions must move (in liquid electrolyte) across a porous separator (thickness=Ls), diffuse across part of the cathode thickness (thickness=Lc) in liquid electrolyte to reach a particular cathode active material particle (average diffusion distance=Lc/2), and then diffuse into (intercalate) the bulk of a particle (diameter=$d_c$ and the average solid-state diffusion distance required=$d_c/2$). In a re-charge situation, the lithium ions move in the opposite direction, but must travel approximately the same distances.

In other words, the operation of a conventional lithium-ion battery involves de-intercalation of lithium ions from the bulk (not the surface) of an electrode active material particle in one electrode (e.g., anode, during discharge) and intercalation of lithium ions into the bulk of an electrode active material particle in the opposite electrode (e.g. cathode). In general, diffusion through a liquid electrolyte is fast, but diffusion through a solid is dramatically slower (by 3-8 orders of magnitude). The presently invented surface-mediated cell (SMC) operates essentially on the exchange of massive lithium ions between the porous electrodes' surfaces (and not in the bulk of the electrode, as in lithium-ion batteries). This strategy completely removes the need for the time-consuming process of lithium intercalation and de-intercalation. The SMC is essentially intercalation-free, with most of the lithium being stored on the massive surface areas of the electrode active materials. Typically >90% of lithium atoms are captured on graphene surfaces, and more typically less than 1% of lithium could accidentally enter the interior of a multi-layer graphene structure. The charge/discharge time of a SMC is limited only by the migration of lithium ions through liquid electrolyte (organic or ionic liquid), which is very fast and results in ultra-high power densities unmatched even by the supercapacitors (which are noted for their high power densities). This is further explained in what follows:

Assume that the diffusion coefficient of Li ions in a particular medium is D and a required travel distance is x, then the required diffusion time can be approximated as $t \sim x^2/D$, according to a well-known kinetics equation. As a first-order of approximation, the total required time scale for a lithium ion to complete a charge or discharge process may be estimated as:

$$t_{total} = (La/2)^2/D_{electrolyte} + (d_a/2)^2/D_a + (Ls)^2/D_s + (Lc/2)^2/D_{electrolyte} + (d_c/2)^2/D_c \quad (1)$$

where $D_{electrolyte}$=Li ion diffusion coefficient in electrolyte, $D_a$=Li ion diffusion coefficient in an anode active material particle, $D_s$=Li ion diffusion coefficient through a porous separator, and $D_c$=Li ion diffusion coefficient in a cathode active material particle.

Representative diffusion coefficients of $Li^+$ in or through various liquid mediums or solid membrane or particles are given below (based on open literature data): liquid electrolyte ($2 \times 10^{-6}$ $cm^2/s$); separator ($7.5 \times 10^{-7}$ $cm^2/s$); $LiFePO_4$ cathode ($10^{-13}$ $cm^2/s$); $Li_3V_2(PO_4)_3$ cathode ($10^{-13}$ to $10^{-9}$ $cm^2/s$); nano-Si anode ($10^{-12}$ $cm^2/s$); graphite anode ($1-4 \times 10^{-10}$ $cm^2/s$); and $Li_4Ti_5O_{12}$ anode ($1.3 \times 10^{-11}$ $cm^2/s$). This implies that, for a conventional lithium ion battery cell wherein $LiFePO_4$ particles are used as a cathode active material, the final term, $(d_c/2)^2/D_c$, in Eq. (1) dominates the required total diffusion time due to its excessively low diffusion coefficient. Actually, the value of diffusion coefficient varies between $10^{-10}$ and $10^{-16}$ cm$^2$/s, depending on the lithium content in solid solution Li$_x$FePO$_4$ and Li$_{1-x}$FePO$_4$ (X<0.02) or the LiFePO$_4$/FePO$_4$ phase ratio.

In contrast, in a super-battery (partially surface-mediated cell) containing a meso-porous cathode of a functionalized nano carbon material (e.g., graphene, CNT, or disordered carbon) and a lithium metal foil as the anode (schematically illustrated in FIG. 1(C)), Li ions do not have to diffuse through a solid-state cathode particle and, hence, are not subject to the limitation by a low solid-state diffusion coefficient at the cathode (e.g. $10^{-13}$ cm$^2$/s in a LiFePO$_4$ particle). Instead, the cathode active materials are highly porous, allowing liquid electrolyte to reach the interior of the pores where the functional groups are present to readily and reversibly react with lithium ions that diffuse into these pores through a liquid medium (not a solid medium) with a high diffusion coefficient (e.g., $2 \times 10^{-6}$ cm$^2$/s). In such a super-battery, the final term, $(d_c/2)^2/D_c$, in Eq. (1) is practically non-existing. The required total diffusion time is now dictated by the thicknesses of the electrodes and the separator. The above discussion is based on the premise that the reversible reaction between a functional group and a lithium ion in the electrolyte is fast, and the whole charge-discharge process is not reaction-controlled.

In a prior art lithium-ion capacitor (LIC), the cathode is a meso-porous structure of a nano carbon material (e.g., activated carbon), but lithium titanate or graphite particles constitute the anode (schematically illustrated in FIG. 1(B)). In a cell discharge situation, lithium ions must diffuse out of lithium titanate particles or graphite particles (a slow de-intercalation step), and then migrate in liquid electrolyte across the anode thickness. Subsequently, lithium ions must move (in liquid electrolyte) across a porous separator, diffuse across part of the cathode thickness in liquid electrolyte to reach a location close to a surface area of a nano-structured cathode active material. There is no need for solid-state diffusion at the cathode side. The whole process is essentially dictated by the solid-state diffusion at the anode. Hence, this LIC should exhibit a slower kinetic process (hence, a lower power density) as compared to the super-battery (partially surface-mediated).

By plugging representative values of the various parameters in Eq. (1) we obtain the total lithium migration time required of a battery charge or discharge process for several conventional lithium-ion battery types and several prior art lithium super-battery cells and LICs. The first group is a conventional lithium-ion battery with a graphite particle anode and lithium iron phosphate cathode (Gr/LiFePO$_4$). The second and third groups are both conventional Li-ion batteries with a LiFePO$_4$ cathode and a Si particle- or lithium titanate-based anode, respectively (Nano-Si/LiFePO$_4$ and Li$_4$Ti$_5$O$_{12}$/LiFePO$_4$). The fourth group is a LIC (Li$_4$Ti$_5$O$_{12}$/f-CNM) where the anode is composed of Li$_4$Ti$_5$O$_{12}$ particles and the cathode is functionalized carbon nano material (f-CNM), such as CNT or activated carbon (AC). The fifth group is a partially surface-mediated cell (Li foil/f-CNM) where the anode is a lithium foil and the cathode is a carbon nano material. These data are shown in Table 1(a) and (b) below:

TABLE 1(a)

Parameters used in the present calculations (CNM = carbon nano materials, including carbon nanotubes (CNTs), nano graphene platelets (NGPs), disordered carbon, etc; Gr = graphite).

| Cell Type (Anode/Cathode) | $D_{li}$ in Electrolyte cm$^2$/s | La (um) | Anode Particle Dia., da (um) | $D_{li}$ in anode particle cm$^2$/s | Sep. thick. (um) | $D_{li}$ in separator cm$^2$/s | Lc (um) | Cathode particle Dia., dc (um) | $D_{li}$ in cathode particle cm$^2$/s | Total diffusion time (sec) |
|---|---|---|---|---|---|---|---|---|---|---|
| Gr/LiFePO$_4$ | 1.00E−06 | 200 | 20 | 2.00E−10 | 100 | 7.50E−07 | 200 | 1 | 1.0E−13 | 3.02E+04 |
| Gr/LiFePO$_4$-nano | 1.00E−06 | 200 | 20 | 2.00E−10 | 100 | 7.50E−07 | 200 | 0.1 | 1.0E−13 | 5.48E+03 |
| Gr/LiFePO$_4$-nano | 1.00E−06 | 200 | 1 | 2.00E−10 | 100 | 7.50E−07 | 200 | 0.1 | 1.0E−13 | 4.96E+02 |
| Nano-Si/LiFePO$_4$ | 1.00E−06 | 200 | 0.1 | 1.00E−12 | 100 | 7.50E−07 | 200 | 0.1 | 1.0E−13 | 5.08E+02 |
| Li$_4$Ti$_5$O$_{12}$/LiFePO$_4$ | 1.00E−06 | 200 | 0.1 | 1.30E−11 | 100 | 7.50E−07 | 200 | 0.1 | 1.0E−13 | 4.85E+02 |
| Li$_4$Ti$_5$O$_{12}$/LiFePO$_4$ | 1.00E−06 | 100 | 0.05 | 1.30E−11 | 50 | 7.50E−07 | 100 | 0.05 | 1.0E−13 | 1.21E+02 |
| Li$_4$Ti$_5$O$_{12}$/f-CNM | 1.00E−06 | 200 | 0.1 | 1.30E−11 | 100 | 7.50E−07 | 200 | 0.1 | 1.0E−6 | 2.35E+02 |
| Li$_4$Ti$_5$O$_{12}$/f-CNM | 1.00E−06 | 20 | 0.1 | 1.30E−11 | 20 | 7.50E−07 | 20 | 0.1 | 1.0E−6 | 5.26E+00 |
| Li$_4$Ti$_5$O$_{12}$/f-CNM | 1.00E−06 | 2 | 0.1 | 1.30E−11 | 2 | 7.50E−07 | 2 | 0.1 | 1.0E−6 | 1.96E+00 |
| Li$_4$Ti$_5$O$_{12}$/f-CNM | 1.00E−06 | 2 | 0.1 | 1.30E−11 | 2 | 1.00E−06 | 0.2 | 0.1 | 1.0E−6 | 1.94E+00 |
| Li foil/f-CNM | 1.00E−06 | 10 | 0 | 1.30E−11 | 10 | 7.50E−07 | 0.3 | 0.1 | 1.0E−6 | 5.84E−01 |
| Li foil/f-CNM | 1.00E−06 | 10 | 0 | 1.30E−11 | 10 | 7.50E−07 | 3 | 0.1 | 1.0E−6 | 6.06E−01 |
| Li foil/f-CNM | 1.00E−06 | 30 | 0 | 1.30E−11 | 10 | 7.50E−07 | 30 | 0.1 | 1.0E−6 | 4.83E+00 |
| Li foil/f-CNM | 1.00E−06 | 30 | 0 | 1.30E−11 | 10 | 7.50E−07 | 200 | 0.1 | 1.0E−6 | 1.03E+02 |

TABLE 1(b)

The required diffusion time to reach a particle in the anode ($t_{La}$), diffusion in the anode particle (ta), diffusion time through the separator (ts), diffusion time to reach a cathode particle ($t_{Lc}$), and the diffusion time in the cathode particle (tc).

| $t_{La}$ (sec) | Ta (sec) | Ts (sec) | $t_{Lc}$ (sec) | Tc (sec) | Total time (sec) | Total time (hours) | Cell type |
|---|---|---|---|---|---|---|---|
| 1.00E+02 | 5.00E+03 | 3.33E+01 | 1.00E+02 | 1.39E+05 | 3.02E+04 | 8.40 | Gr/LiFePO$_4$ |
| 1.00E+02 | 5.00E+03 | 3.33E+01 | 1.00E+02 | 1.39E+03 | 5.48E+03 | 1.52 | Gr/LiFePO$_4$-nano |
| 1.00E+02 | 1.25E+01 | 3.33E+01 | 1.00E+02 | 1.39E+03 | 4.96E+02 | 0.138 | Gr/LiFePO$_4$-nano |
| 1.00E+02 | 2.50E+01 | 3.33E+01 | 1.00E+02 | 1.39E+03 | 5.08E+02 | 0.141 | Nano-Si/LiFePO$_4$-n |
| 1.00E+02 | 1.92E+00 | 3.33E+01 | 1.00E+02 | 1.39E+03 | 4.85E+02 | 0.135 | Li$_4$Ti$_5$O$_{12}$/LiFePO$_4$-n |

TABLE 1(b)-continued

The required diffusion time to reach a particle in the anode ($t_{La}$), diffusion in the anode particle (ta), diffusion time through the separator (ts), diffusion time to reach a cathode particle ($t_{Lc}$), and the diffusion time in the cathode particle (tc).

| $t_{La}$ (sec) | Ta (sec) | Ts (sec) | $t_{Lc}$ (sec) | Tc (sec) | Total time (sec) | Total time (hours) | Cell type |
|---|---|---|---|---|---|---|---|
| 2.50E+01 | 4.81E−01 | 8.33E+00 | 2.50E+01 | 3.47E+02 | 1.21E+02 | 0.00337 | $Li_4Ti_5O_{12}$/$LiFePO_4$-n |
| 1.00E+02 | 1.92E+00 | 3.33E+01 | 1.00E+02 | 2.50E−05 | 2.35E+02 | 6.53E−02 | $Li_4Ti_5O_{12}$/f-CNM |
| 1.00E+00 | 1.92E+00 | 1.33E+00 | 1.00E+00 | 2.50E−05 | 5.26E+00 | 1.46E−03 | $Li_4Ti_5O_{12}$/f-CNM |
| 1.00E−02 | 1.92E+00 | 1.33E−02 | 1.00E−02 | 2.50E−05 | 1.96E+00 | 5.43E−04 | $Li_4Ti_5O_{12}$/f-CNM |
| 1.00E−02 | 1.92E+00 | 1.00E−02 | 1.00E−04 | 2.50E−05 | 1.94E+00 | 5.40E−04 | $Li_4Ti_5O_{12}$/f-CNM |
| 2.50E−01 | 0.00E+00 | 3.33E−01 | 2.25E−04 | 2.50E−05 | 5.84E−01 | 1.62E−04 | Li foil/f-CNM |
| 2.50E−01 | 0.00E+00 | 3.33E−01 | 2.25E−02 | 2.50E−05 | 6.06E−01 | 1.68E−04 | Li foil/f-CNM |
| 2.25E+00 | 0.00E+00 | 3.33E−01 | 2.25E+00 | 2.50E−05 | 4.83E+00 | 1.34E−03 | Li foil/f-CNM |
| 2.25E+00 | 0.00E+00 | 3.33E−01 | 1.00E+02 | 2.50E−05 | 1.03E+02 | 2.85E−02 | Li foil/f-CNM |

Several significant observations can be made from the data of Table 1(a) and (b):

(1) Conventional lithium ion batteries (first group above) featuring a micron-sized graphite particle anode (graphite diameter=20 μm) and a micron-sized $LiFePO_4$ cathode (particle diameter=1 μm) would require several hours (e.g. 8.4 h) to complete the required lithium ion diffusion process. This is why conventional lithium ion batteries exhibit very low power densities (typically 100-500 W/Kg) and very long re-charge times.

(2) This problem of a long diffusion time can be partially alleviated by using nano-scaled particles, as in the second and third groups above (e.g., 8 minutes if both the anode and cathode active material particles have a diameter of 100 nm).

(3) In contrast, for the LIC featuring a carbon cathode (e.g. f-CNT) and an anode of $Li_4Ti_5O_{12}$ nano particles, the required diffusion times are between 235 sec (<4 minutes) for a cathode thickness of 200 μm and 1.96 sec for an ultra-thin cathode (e.g., 0.3 μm LBL f-CNT as prepared by the layer-by-layer method of the MIT research group [S. W. Lee, et al, Nature Nanotechnology, 5 (2010) 531-537]). Unfortunately, such an ultra-thin electrode (0.3-3 μm) is of extremely limited utility value.

(4) For the lithium super-batteries (partially surface-mediated), the electrode thickness is a dominating factor. For instance, in the case of using lithium metal foil as the anode (first type), the total diffusion time can be as short as <0.6 sec (when the cathode thickness is 0.3 μm or 3 μm), which increases to 103 sec (still less than 2 minutes) when the cathode thickness is 200 μm.

Figure 11:
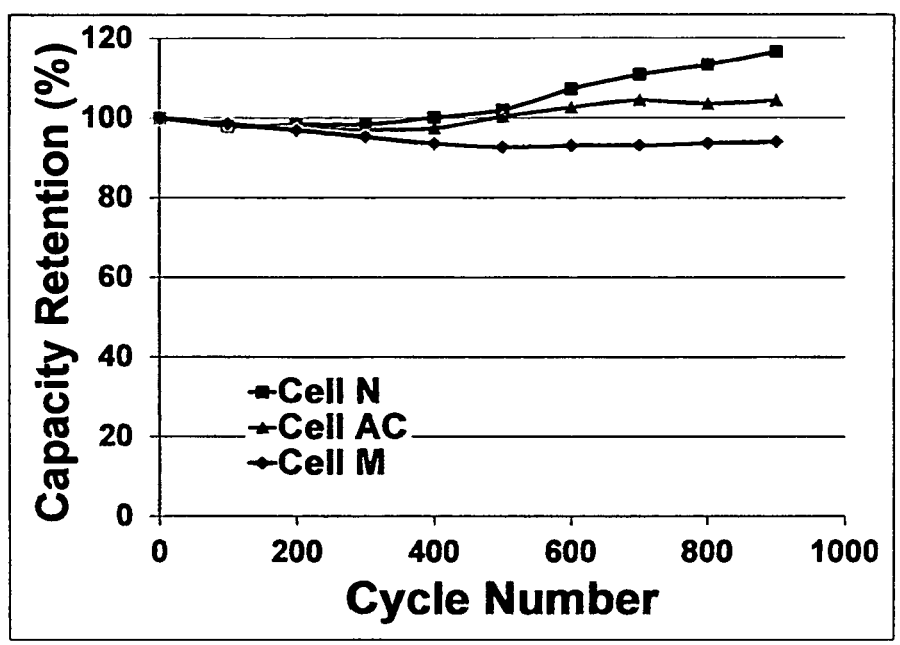
FIG. 11 Cycle performance of several SMCs: Cell N (chemically reduced graphene-based), Cell AC (activated carbon), and Cell M (exfoliated graphite from artificial graphite).

(5) The above observations imply that the lithium super-batteries should have an extraordinary power density, particularly when the electrodes are ultra-thin. This is why Lee, et al. at MIT were able to report a power density of 100 Kw/Kg for their lithium super-battery cells having a LBL f-CNT cathode of 0.3 μm thick. However, a useful electrode size is at least 50 μm in thickness (typically between 100 and 300 μm) and, again, the cells with a cathode thickness of 0.3-3.0 μm have very limited practical utility value. The exceptionally high power densities observed for the lithium super-batteries with a LBL f-CNT cathode reported by Lee, et al are due to the ultra-thin cathode thickness (0.3 μm). As shown in FIG. 11, our graphene-based surface-mediated cells (typically having an electrode thickness of 100-300 μm) even perform better than the thin electrode-based LBL f-CNT cell (partially surface mediated).

It may be noted that the above calculations for the super-batteries containing a lithium foil as the anode are applicable to the instant surface-mediated energy storage device as well, with the exception that the lithium foil thickness may be replaced by the thickness of a nano-structured anode. The lithium source (lithium particles or pieces of lithium foil) would not add additional anode thickness value in the time calculations since the nano-structured anode is "elastic" or compressible. The lithium foil may be compressed against the nano-structured anode, or the lithium particles may be incorporated in the nano-structured anode when the battery device is made. Once lithium particles or foil are ionized during the first discharge cycle, the nano-structured anode (e.g. NGP or CNT-based mat) would snap back to touch the separator. Based on the above calculations, the required diffusion times for the super-battery (partially surface-mediated) and those for the totally surface-controlled (surface-mediated) cell should be approximately the same. Then, why would the surface-mediated cell be better than the super-battery with a lithium foil alone as the anode (without the nano-structured NGP)?

Surface-Mediated Cell Versus Earlier Lithium Super-Battery (Partially Surface-Mediated)

It may be noted that, for the lithium super-battery (Li foil/f-CNM) where the anode is a lithium foil, there is no anode particle and, hence, no particle diameter ($d_a$ was assigned as zero in the above calculation). During the first discharge, Li foil is electrochemically ionized to release ions. In the above calculations, this surface-controlled reaction was assumed to be fast and not rate-limiting. In reality, this surface reaction can become rate-limiting when a high discharge rate is required (i.e. when the external circuit or load demands a high current density). This limitation may not be controlled by the surface ionization rate itself, but instead by the limited amount of surface area of the lithium foil during the first discharge cycle. In other words, at a given moment of time during the first discharge, there is only so much surface area from which lithium ions can be released simultaneously.

During the re-charge cycle, lithium ions move back from the cathode to the anode side, trying to re-deposit onto a surface of the anode current collector (e.g. a copper foil), which is the only surface available at the anode of a super-battery (partially surface-mediated cell). There are two serious issues associated with using a current collector (e.g. copper foil) alone to accommodate the in-flux of massive lithium ions during re-charge:

(1) If the re-charge rate is high (with a high circuit current density), the huge numbers of lithium ions that rapidly migrate back to the anode side are all trying to deposit simultaneously onto the surface of a current collector, which typically has a very low surface area (specific surface area typically <<1 m²/g for Cu foil). This limited surface area becomes deposition rate-limiting.

(2) If the re-charge rate is low (with a low current density), the returning lithium ions could find a way to deposit onto the current collector surface in a non-uniform manner. Certain favorable spots will receive more deposited lithium atoms first, and these spots could continue to be deposited at a higher rate. Such a non-uniform lithium deposition could lead to the formation of dendrites at the anode, which could grow longer and longer as the number of cycles increases, and eventually penetrate through the separator to reach the cathode side, causing internal shorting. This possibility could pose a similar problem that plagued the lithium metal battery industry in late 1980s and eventually resulted in the termination of essentially all the lithium metal cell productions in early 1990s. We would not want to see this potential internal shorting problem lead to the same disastrous result.

After an extensive and in-depth study, the applicants have solved these two issues by implementing a nano-structured anode between an anode current collector and a porous separator. This nano-structured anode is preferably composed of a nano carbon material having a high specific surface area (preferably greater than 100 m²/g), such as the nano graphene platelet (NGP, collectively referring to both single-layer and multi-layer versions of graphene, graphene oxide, graphene fluoride, doped graphene, etc), carbon nano-tube (single-walled or multi-walled), carbon nano-fiber (vapor-grown, electro-spun polymer derived, etc), disordered carbon, metal nano-wire, conductive nano-wire, etc. The nano-structured anode preferably has a specific surface area greater than 100 m²/g, more preferably greater than 500 m²/g, further preferably greater than 1,000 m²/g, even more preferably greater than 1,500 m²/g, and most preferably greater than 2,000 m²/g. These surfaces are preferably in direct contact with electrolyte (preferably organic liquid electrolyte) to capture lithium ions directly therefrom or to release lithium ions directly thereto.

It is quite unexpected for us to observe that the implementation of this nano-structured anode significantly increases not only the power density (Kw/Kg), but also the energy density (Wh/Kg) of the presently invented surface-mediated, lithium ion-exchanging energy storage device. We were really very surprised to observe these highly significant observations (presented in the Examples of this specification). Not wishing to be limited by the theory, but we believe that this newly implemented nano-structured anode plays at least the following three roles:

(1) During the re-charge cycle, the massive surface areas of this nano-structured anode enable huge numbers of lithium ions to be rapidly deposited simultaneously in a high current density situation (high charge rate). This makes it possible for the energy storage device to be re-charged in seconds or fractions of a second. This had not been possible with any prior art lithium metal or lithium ion battery, or any prior art lithium super-battery (partially surface-mediated).

(2) During the first discharge operation of a freshly made surface-mediated energy storage device of the instant invention, the lithium foil or lithium particles get ionized, releasing lithium ions at the anode which travel into the cathode side and get captured by the graphene surfaces of the cathode. Upon re-charging, these lithium ions return to the anode and uniformly deposit onto the massive surfaces of the nano-structured anode, forming an ultra-thin coating of lithium thereon. Such a huge surface area of lithium-decorated surfaces enables simultaneous release of great amounts of lithium ions during subsequent discharge cycles. This concurrent, massive releasing of lithium ions had not been possible in a battery with an anode current collector alone whose specific surface area is normally much less than 1 m²/g. The high specific surface area of the nano-structured anode, >>100 m²/g, enables both fast charging and fast discharging, achieving an unprecedented power density.

(3) The nano-structured anode, electronically connected to a current collector, also provides a uniform electric field in the anode space, allowing the returning lithium ions to more homogeneously deposit onto the surface of nano materials (e.g. graphene). Since huge surface areas are available for this purpose, only an extremely small amount of lithium is deposited onto any single spot, insufficient for the growth of a dendrite. These reasons imply that the presently invented surface-controlled energy storage device is a safer energy storage device.

Surface-Controlled Battery Device Versus Prior Art Supercapacitors

This new surface-mediated, lithium ion-exchanging battery device is also patently distinct from the conventional supercapacitor in the following aspects:

(1) The conventional or prior art supercapacitors do not have a lithium ion source implemented at the anode when the cell is made.

Figure 3:
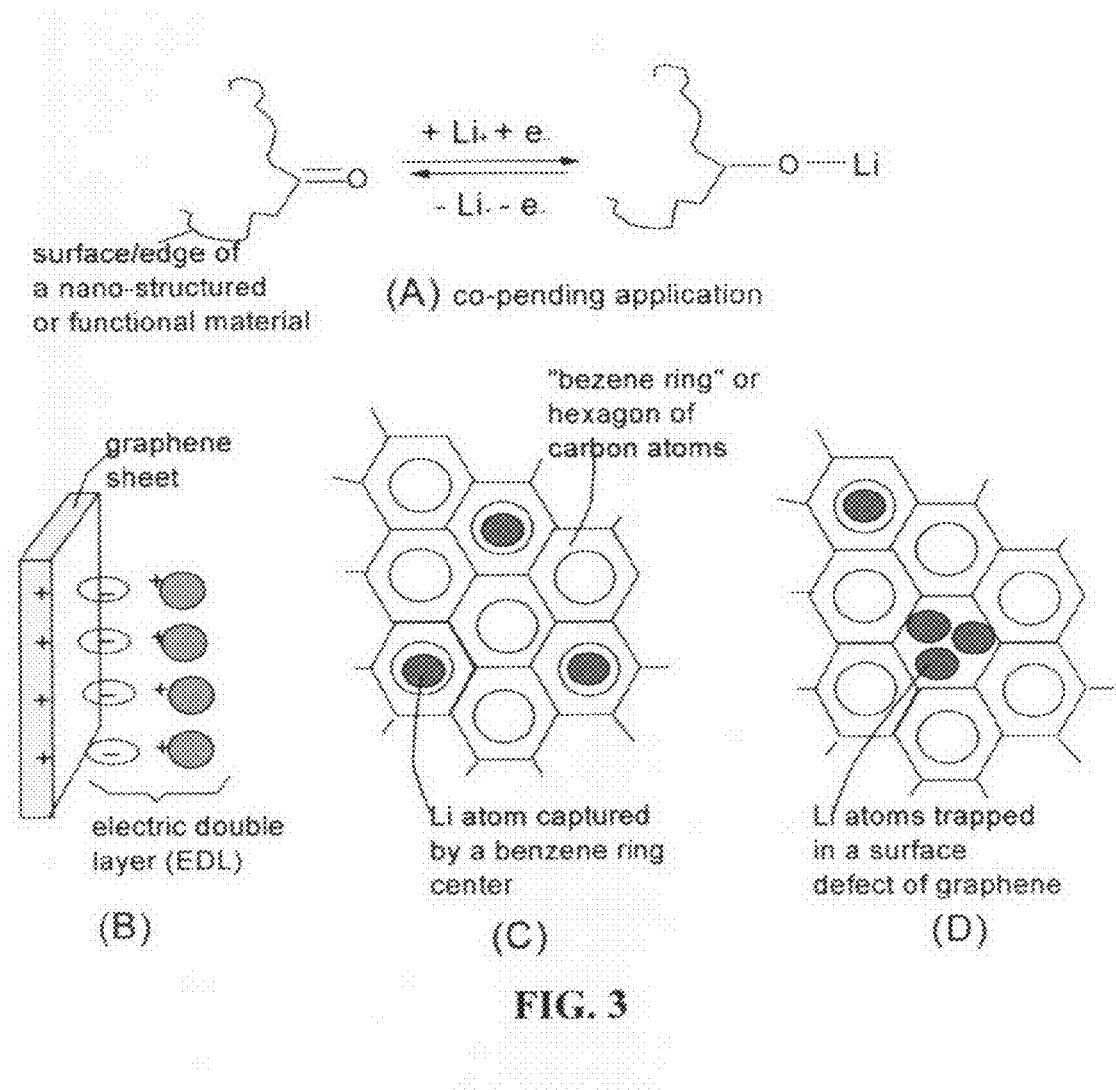
FIG. 3 (A) Schematic of a lithium storage mechanism disclosed in a co-pending application (the functional group attached to an edge or surface of an aromatic ring or small graphene sheet can readily react with a lithium ion to form a redox pair); (B) Possible formation of electric double layers as a minor or negligible mechanism of charge storage; (C) A major lithium storage mechanism (lithium captured at a benzene ring center of a graphene plane), which is fast, reversible, and stable; (D) Another major lithium storage mechanism (lithium atoms trapped in a graphene surface defect).

(2) The electrolytes used in these prior art supercapacitors are mostly lithium-free or non-lithium-based. Even when a lithium salt is used in a supercapacitor electrolyte, the solubility of lithium salt in a solvent essentially sets an upper limit on the amount of lithium ions that can participate in the formation of electric double layers of charges inside the electrolyte phase (near but not on an electrode material surface, as illustrated in FIG. 3(B)). As a consequence, the specific capacitance and energy density of the resulting supercapacitor are relatively low (e.g. typically <6 Wh/kg based on total cell weight), as opposed to, for instance, 160 Wh/kg (based on total cell weight) of the presently invented surface-mediated cells.

(3) The prior art supercapacitors are based on either the electric double layer (EDL) mechanism or the pseudo-capacitance mechanism to store their charges. In both mechanisms, no massive lithium ions are exchanged between the two electrodes (even when a lithium salt is used in electrolyte). In the EDL mechanism, for instance, the cations and anions in the electrolyte pair up to form electric double layers of charges near the surfaces of an electrode active material (but not on the surface). The cations are not captured or stored in or on the surfaces of the electrode active material. In contrast, using graphene as an example of an electrode active material in a surface-mediated cell of the present invention, lithium atoms can be captured or trapped at the defect sites, graphene edges, benzene ring centers of a graphene plane. In our co-pending application (U.S. patent application Ser. No. 12/928,927), functional groups on graphene surfaces are used to capture lithium. In the instant application, a non-functionalized material (having no functional group) with high surface areas in direct contact with liquid electrolyte use the benzene ring centers and surface defects of graphene sheets to capture lithium ions from electrolyte.

(4) In the EDLs, both the cations and anions co-exist in both the anode and the cathode when the supercapacitor is in a charged state. For instance, in one of the two electrodes of a symmetric supercapacitor, negative charges are present on the surfaces of activated carbon particles, which attract the positively charged species to form one layer of positive charges near these surfaces. However, there are, in turn, negatively charged species that are attracted by these positive charges to form a layer of negative charges nearby. The opposite electrode of the supercapacitor has a similar arrangement, but the charges are opposite in polarity. This is the well-known concept of Helmholtz diffuse charge layers in electrochemistry. When the supercapacitor is discharged, the charges on activated carbon particle surfaces are used or disappear and, consequently, the negatively charged species and the positively charged species of the salt become randomized and stay inside the electrolyte phase (not on the activated carbon particle surfaces). In contrast, when the SMC is in a charged state, the majority of lithium ions are attracted to attach or electro-plate on the graphene surfaces at the anode and the cathode side is essentially free of any lithium. After discharge, essentially all the lithium atoms are captured by the cathode active material surfaces with no or little lithium staying inside the electrolyte.

(5) The prior art symmetric supercapacitors (EDL supercapacitors) using a lithium salt-based organic electrolyte operate only in the range of 0-3 volts. They cannot operate above 3 volts; there is no additional charge storing capability beyond 3 volts and actually the organic electrolyte typically begins to break down at 2.7 volts. In contrast, the surface-mediated cells of the present invention operate typically in the range of 1.0-4.5 volts, most typically in the range of 1.5-4.5 volts (e.g. please see FIG. 9), but preferably in the range of 1.5-4.0 volts. These two ranges of operating voltage are reflections of totally distinct charge storage mechanisms. Even though, on the paper, there appears to be an overlap of 1.5-3.0 volts between these two voltage ranges (range of 1-3 and range of 1.5-4.5 volts), this overlap is artificial, sheer coincidental, and not scientifically meaningful since the charge storage mechanisms are fundamentally different, as evidenced by the two vastly different cyclic voltammetry (CV) diagrams in FIG. 9.

(6) The prior art EDL supercapacitors typically have an open-circuit voltage of 0-0.3 volts. In contrast, the SMC typically has an open-circuit voltage of >0.6 volts, more commonly >0.8 volts, and most commonly >1.0 volts (some >1.2 volts or even >1.5 volts, depending on the type and amount of the anode active material relative to the cathode, and the amount of the lithium source).

Figure 10A:
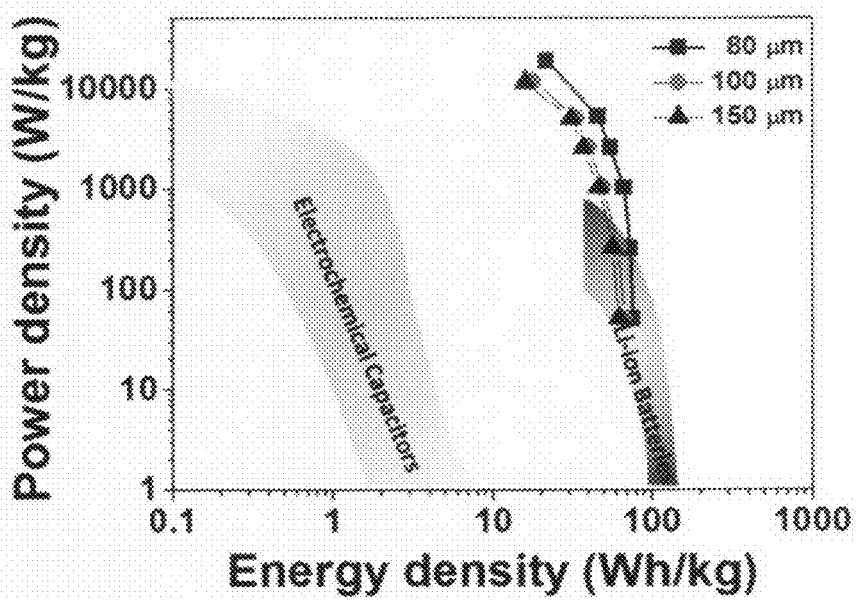
FIG. 10 The Ragone plots of graphene surface-enabled Li ion-exchanging cells with different electrode thicknesses: The energy density and power density values were calculated based on total cell weight (A) and based on cathode weight only (B).

(7) The Ragone plots of FIGS. 10(A) and (B) have nicely demonstrated that the surface-mediated cells of the present invention are a class of energy storage cells by itself, distinct from both supercapacitors and lithium-ion batteries.

(8) FIG. 11 show the cycle performance of several SMCs: Cell N (graphene-based), Cell AC (activated carbon), and Cell M (exfoliated graphite from artificial graphite). The observation that some of the SMCs show an continuing increase in capacity with the number of charge/discharge cycles (after some minor initial decay) further demonstrates the uniqueness of SMCs from either supercapacitors or lithium-ion batteries.

Charge Storage Mechanisms and Energy Density Considerations

Not wishing to be limited by theory, but we think that the specific capacity of an electrode in a Li-ion exchanging, surface-mediated cell (SMC) is governed by the number of active sites on graphene surfaces of a nano-structured carbon material that are capable of capturing lithium ions therein or thereon. The nano-structured carbon material may be selected from activated carbon (AC), carbon black (CB), hard carbon, soft carbon, exfoliated graphite (EG), and isolated graphene sheets (nano graphene platelet or NGP) from natural graphite or artificial graphite. These carbon materials have a common building block—graphene or graphene-like aromatic ring structure. We think that there are four possible lithium storage mechanisms:

Mechanism 1: The geometric center of a benzene ring in a graphene plane is an active site for a lithium atom to adsorb onto;

Mechanism 2: The defect site on a graphene sheet is capable of trapping a lithium ion;

Mechanism 3: The cations ($Li^+$) and anions (from a Li salt) in the liquid electrolyte are capable of forming electric double layers of charges near the electrode material surfaces;

Mechanism 4: A functional group on a graphene surface/edge can form a redox pair with a lithium ion.

Surface Bonding Mechanism (Mechanism 1):

Lithium atoms are capable of forming stable interactions with C atoms on a graphene plane when electrolyte is not present to compete for lithium. The Li—C bond in such a layer (without a functional group) would not result in an $sp^2$ to an $sp^3$ transition of carbon orbitals. Energy calculations have indicated the possible stability of such Li atom-adsorbed graphene layers (with lithium atoms bonded to the centers of benzene rings of a graphene plane) without the presence of electrolyte. We have surprisingly observed that the Li-adsorbed graphene layer (FIG. 3(D)) can be spontaneously formed in the presence of electrolyte. This was unexpected since lithium ions have excellent chemical compatibility with other ingredients in the electrolyte (this is why they naturally exist in the electrolyte) and these ingredients (e.g. solvent) would compete against the graphene surface for trying to keep the lithium ions in the solvent phase, as opposed to being "high-jacked" by graphene surface. The bonding between lithium atoms and graphene surface has been most surprisingly strong.

Lithium Ion Trapping at Defect Sites (Mechanism 2):

Active defects such as edges and vacancies (e.g. FIG. 3(D)) in carbonaceous materials might be capable of accommodating additional Li. There are a large number of these defects or disorder sites in NGPs inevitably induced by the oxidation and reduction processes commonly used for graphene production.

Electric Double Layer (EDL) (Mechanism 3):

The SMC electrolyte is typically composed of a lithium ion salt dissolved in a solvent. The electrolytic salts can be selected from lithium perchlorate ($LiClO_4$), lithium hexafluorophosphate ($LiPF_6$), lithium borofluoride ($LiBF_4$), lithium hexafluoroarsenide ($LiAsF_6$), and lithium trifluorometasulfonate ($LiCF_3SO_3$), etc. In principle, as illustrated in FIG. 3(B), some electric double layers (EDL) may be conceptually formed by cations (e.g. $Li^+$) and their counter ions (e.g. $PF_6^-$ and $BF_4^-$ anions) and this EDL contribution to the energy storage capacity of a SMC cell is governed by the electrolytic salt concentration in solvent.

Figure 9:
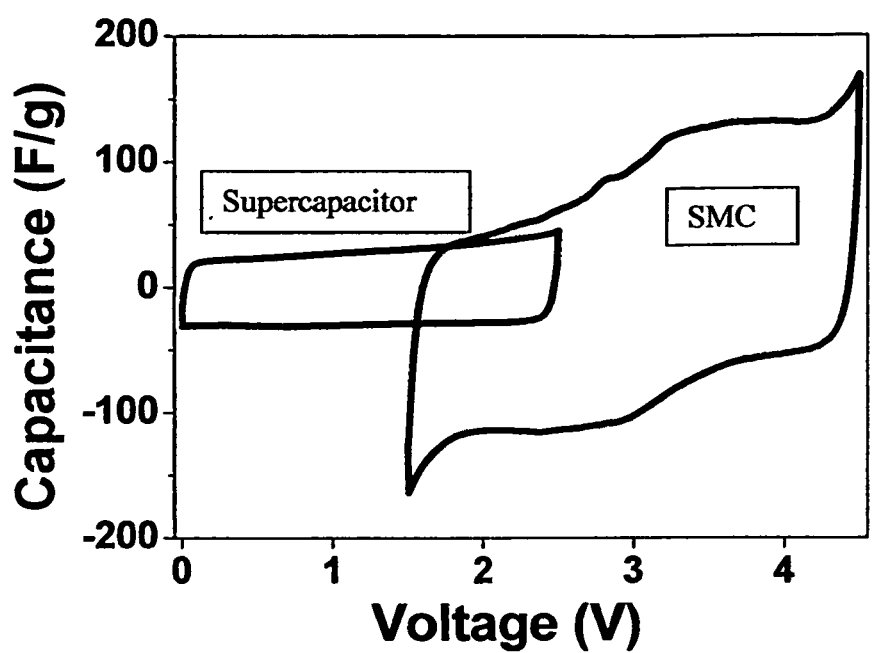
FIG. 9 Cyclic voltammetry (CV) diagrams of a graphene-based symmetric supercapacitor (left curve) and a corresponding surface-mediated cell of the present invention having a lithium source implemented at the anode (right curve).

Given a sufficient amount of electrode surface areas, the maximum contribution of Mechanism 3 to the overall charge storage capacity is dictated by the concentration of cations or anions. The EDL mechanism typically contributes to less than approximately 10% (more typically <5%) of the total lithium ion storage capacity of a SMC, explained below: We have prepared and tested several symmetric supercapacitors each composed of two identical graphene- or other nano-structured electrodes (anode and cathode having identical compositions), but with the anode having no Li metal foil/power as a lithium source and no pre-lithiation. For instance, shown in FIG. 9 are CV diagrams of a graphene-based supercapacitor and the corresponding SMC. In both cells, the electrolyte is 1M $LiPF_6$/EC+DMC and the scan rate is 25 mV/s. It is of interest to note that this organic electrolyte can only operate from 0 to <2.7 volts in a symmetric supercapacitor configuration, but can operate from 1.5 to 4.5 volts in the SMC configuration. This has been most surprising since no organic electrolyte (based on organic solvent) in a supercapacitor has been able to operate up to 4.0 volts (typically <3.5 volts and more typically <<3.0 volts). Organic electrolytes are defined as those electrolytes that are not based on water or ionic liquid, but containing organic solvent. The capacity representing the overlapped voltage range of 1.5 volts to 2.7 volts covers less than 5% of the total capacity of the SMC. Actually, the operation of the SMC, even within the voltage range of 1.5-2.7 volts, is mainly through surface capturing, not the electric double layer formation.

Formation of Redox Pairs (Mechanism 4):

A surface redox reaction can occur between a lithium ion and a functional group (if any), such as carbonyl (>C=O) or carboxylic group (—COOH), as illustrated in FIG. 3(A). The presence of functional groups, such as —COOH and >C=O, in chemically prepared graphene oxide have been well documented. The formation of these functional groups is a natural result of the oxidizing reactions of graphite by sulfuric acid and strong oxidizing agents (e.g. nitric acid and potassium permanganate commonly used in the preparation of graphene oxide). Both un-separated graphite worms (exfoliated graphite) and the separated graphene sheets (NGPs) can have surface- or edge-borne functional groups. This is the primary lithium storing mechanism disclosed in our co-pending application (U.S. patent application Ser. No. 12/928,927). The SMC in the instant application is based mainly upon Mechanisms 1 and 2.

In general, the electric double layer mechanism contributes to less than 10% (mostly less than 5%) of the charge storage capacity of a SMC. When either the anode or the cathode contains some multi-layer graphene platelets, there might be some intercalation of lithium into the bulk of an active material if the SMC operating voltage goes below 1.5 volts. Even in this case, no more than 20% of the lithium is stored in the bulk of an anode active material when the device is in a charged state, or no more than 20% of the lithium is stored in the bulk of the cathode active material when the device is in a discharged state. Typically, no more than 10% of the lithium is stored in the bulk of the anode active material when the device is in a charged state, or no more than 10% of the lithium is stored in the bulk of the cathode active material when the device is in a discharged state.

Nano-structured materials for use in the anode or cathode of the instant invention may preferably contain nano graphene platelet (NGP), carbon nano-tube (CNT), or disordered carbon. These nano-structured carbon materials can be used as a supporting substrate for other organic or polymeric functional materials that have useful functional groups (e.g., carbonyl) but are not electrically conducting. The CNT is a better known material in the nano material industry and, hence, will not be further discussed herein. What follows is a description of NGP and nano-structured disordered carbon:

Nano Graphene Platelet (NGP)

The applicant's research group was the first in the world to discover single-layer graphene [B. Z. Jang and W. C. Huang, "Nano-scaled Graphene Plates," U.S. patent application Ser. No. 10/274,473 (Oct. 21, 2002); now U.S. Pat. No. 7,071,258 (Jul. 4, 2006)] and the first to use graphene for supercapacitor [L. Song, A. Zhamu, J. Guo, and B. Z. Jang "Nano-scaled Graphene Plate Nanocomposites for Supercapacitor Electrodes" U.S. patent application Ser. No. 11/499,861 (Aug. 7, 2006), now U.S. Pat. No. 7,623,340 (Nov. 24, 2009)], and for lithium-ion battery applications [A. Zhamu and B. Z. Jang, "Nano Graphene Platelet-Based Composite Anode Compositions for Lithium Ion Batteries," U.S. patent application Ser. No. 11/982,672 (Nov. 5, 2007), now U.S. Pat. No. 7,745,047 (Jun. 29, 2010)].

Single-layer graphene or the graphene plane (a layer of carbon atoms forming a hexagonal or honeycomb-like structure) is a common building block of a wide array of graphitic materials, including natural graphite, artificial graphite, soft carbon, hard carbon, coke, activated carbon, carbon black, etc. In these graphitic materials, typically multiple graphene sheets are stacked along the graphene thickness direction to form an ordered domain or crystallite of graphene planes. Multiple crystallites of domains are then connected with disordered or amorphous carbon species. In the instant application, we are able to extract or isolate these crystallites or domains to obtain multiple-layer graphene platelets out of the disordered carbon species. In some cases, we exfoliate and separate these multiple-graphene platelets into isolated single-layer graphene sheets. In other cases (e.g. in activated carbon, hard carbon, and soft carbon), we chemically removed some of the disordered carbon species to open up gates, allowing liquid electrolyte to enter into the interior (exposing graphene surfaces to electrolyte).

In the present application, nano graphene platelets (NGPs) or "graphene materials" collectively refer to single-layer and multi-layer versions of graphene, graphene oxide, graphene fluoride, hydrogenated graphene, nitrogenated graphene, doped graphene, etc.

For the purpose of defining the geometry of an NGP, the NGP is described as having a length (the largest dimension), a width (the second largest dimension), and a thickness. The thickness is the smallest dimension, which is no greater than 100 nm and, in the present application, no greater than 10 nm (preferably no greater than 5 nm). The NGP may be single-layer graphene. When the platelet is approximately circular in shape, the length and width are referred to as diameter. In the presently defined NGPs, there is no limitation on the length and width, but they are preferably smaller than 10 μm and more preferably smaller than 1 μm. We have been able to produce NGPs with length smaller than 100 nm or larger than 10 μm. The NGP can be pristine graphene (with essentially 0% oxygen content, typically <2% oxygen) or graphene oxide (typically from 10 up to approximately 45% by weight oxygen). Graphene oxide can be thermally or chemically reduced to become reduced graphene oxide (typically with an oxygen content of 1-20%, mostly below 5% by weight). For use in the anode and/or the cathode of the lithium super-battery and functional material-based surface-controlled cells disclosed in our earlier applications, the oxygen content was preferably in the range of 5% to 30% by weight, and more preferably in the range of 10% to 30% by weight. However, in the instant application, the SMC electrode typically has less than 5% oxygen (hence, essentially functional group-free) and, in many cases, less than 2%. The specific surface area accessible to liquid electrolyte is the single most important parameter in dictating the energy and power densities of a SMC.

Figure 5:
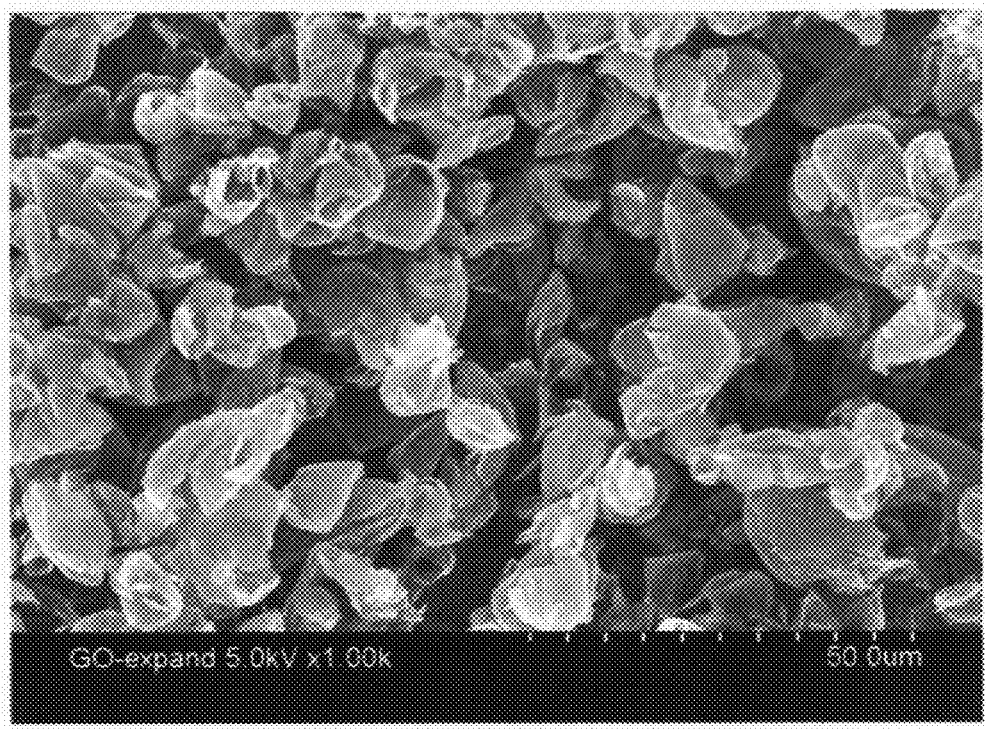
FIG. 5 (A) A SEM image of curved nano graphene sheets; (B) A SEM image of another graphene morphology. All these graphene morphologies provide very high specific surface area (typically from 300 to 2,000 m²/g).
Figure 5:
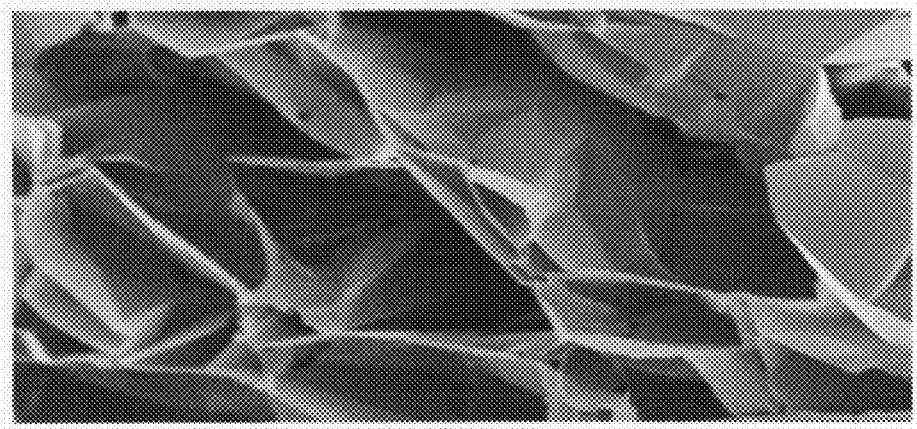

Despite the fact that individual graphene sheets have an exceptionally high specific surface area, flat-shaped graphene sheets prepared by conventional routes have a great tendency to re-stack together or overlap with one another, thereby dramatically reducing the specific surface area that is accessible by the electrolyte. FIG. 5(A) shows a new breed of graphene that is herein referred to as the curved graphene platelet or sheet. Curved NGPs are capable of forming a meso-porous structure having a desired pore size range (e.g. slightly >2 nm) when they were stacked together to form an electrode. This size range appears to be conducive to being accessible by the commonly used lithium-containing electrolytes.

The curved NGPs may be produced by using the following recommended procedures:
(a) dispersing or immersing a laminar graphite material (e.g., natural graphite powder) in a mixture of an intercalant and an oxidant (e.g., concentrated sulfuric acid and nitric acid, respectively) to obtain a graphite intercalation compound (GIC) or graphite oxide (GO);
(b) exposing the resulting GIC or GO to a thermal shock, preferably in a temperature range of 600-1,100° C. for a short period of time (typically 15 to 60 seconds), to obtain exfoliated graphite or graphite worms (some oxidized NGPs with a thickness<100 nm could be formed at this stage if the intercalation/oxidation step was allowed to proceed for a sufficiently long duration of time; e.g. >24 hours);
(c) dispersing the exfoliated graphite to a liquid medium to obtain a graphene-liquid suspension (a functionalizing agent may be added into this suspension if functional groups are desired, as in our co-pending application);
(d) aerosolizing the graphene-liquid suspension into liquid droplets while concurrently removing the liquid to recover curved NGPs. Without the aerosolizing step, the resulting graphene platelets tend to be flat-shaped.

It may be noted that steps (a) to (b) are the most commonly used steps to obtain exfoliated graphite (FIG. 5B) and graphene oxide platelets in the field. Step (d) is essential to the production of curved graphene sheets. Oxidized NGPs or GO platelets may be chemically reduced to recover conductivity properties using hydrazine as a reducing agent, before, during, or after chemical functionalization.

In 2007, we reported a direct ultrasonication method of producing pristine nano graphene directly from graphite particles dispersed in a surfactant-water suspension [A. Zhamu, et al, "Method of Producing Exfoliated Graphite, Flexible Graphite, and Nano-Scaled Graphene Plates," U.S. patent application Ser. No. 11/800,728 (May 8, 2007)]. This method entails dispersing natural graphite particles in a low surface tension liquid, such as acetone or hexane. The resulting suspension is then subjected to direct ultrasonication for 10-120 minutes, which produces graphene at a rate equivalent to 20,000 attempts to peel off graphene sheets per second per particle. The graphite has never been intercalated or oxidized and, hence, requires no subsequent chemical reduction. This method is fast, environmentally benign, and can be readily scaled up, paving the way to the mass production of pristine nano graphene materials. The same method was later studied by others and now more commonly referred to as the "liquid phase production."

Nano-Structured Disordered Carbon

The disordered carbon material may be selected from a broad array of carbonaceous materials, such as a soft carbon, hard carbon, polymeric carbon (or carbonized resin), mesophase carbon, coke, carbonized pitch, carbon black, activated carbon, or partially graphitized carbon. As schematically illustrated in FIGS. 3(A) and (B), a disordered carbon material is typically formed of two phases wherein a first phase is small graphite crystal(s) or small stack(s) of graphite planes (with typically up to 10 graphite planes or aromatic ring structures overlapped together to form a small ordered domain) and a second phase is non-crystalline carbon, and wherein the first phase is dispersed in the second phase or bonded by the second phase. The second phase is made up of mostly smaller molecules, smaller aromatic rings, defects, and amorphous carbon. Typically, the disordered carbon is highly porous (e.g., activated carbon) or present in an ultra-fine powder form (e.g. carbon black) having nano-scaled features (hence, a high specific surface area).

Figure 4A:
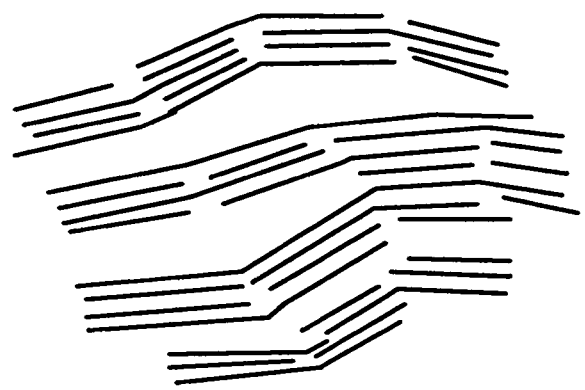
FIG. 4 Examples of disordered carbon that can be used as a nano-structured material having high surface areas (in direct contact with electrolyte) at the anode and/or the cathode: (A) Schematic of a soft carbon, wherein neighboring stacks of graphene sheets or small aromatic rings are favorably oriented with respect to each other at a small angle that is conducive to the growth or merging (graphitizable); (B) hard carbon (non-graphitizable); (C) carbon black, having a large number of small aromatic ring domains arranged to form a nano-scaled spherical particle. Preferably, an individual carbon black particle is activated to open up small gates that enable liquid electrolyte to access the edge- or surface-borne functional groups inside a particle, as illustrated in (D).

Soft carbon refers to a carbonaceous material composed of small graphite crystals wherein the orientations of these graphite crystals or stacks of graphene sheets are conducive to further merging of neighboring graphene sheets or further growth of these graphite crystals or graphene stacks (FIG. 4(A)) using a high-temperature heat treatment (graphitization). Hence, soft carbon is said to be graphitizable.

Figure 4B:
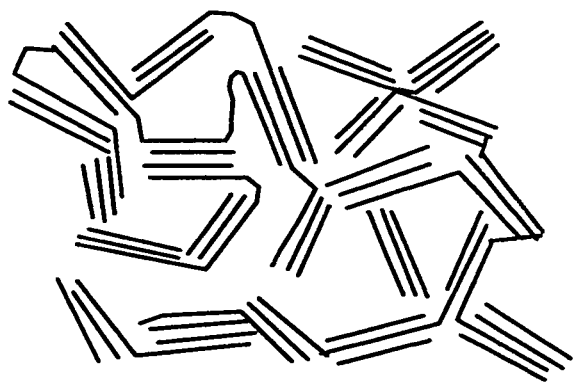

Hard carbon (FIG. 4(B)) refers to a carbonaceous material composed of small graphite crystals wherein these graphite crystals or stacks of graphene sheets are not oriented in a favorable directions (e.g. nearly perpendicular to each other) and, hence, are not conducive to further merging of neighboring graphene sheets or further growth of these graphite crystals or graphene stacks (i.e., not graphitizable).

Figures 4C, 4D:
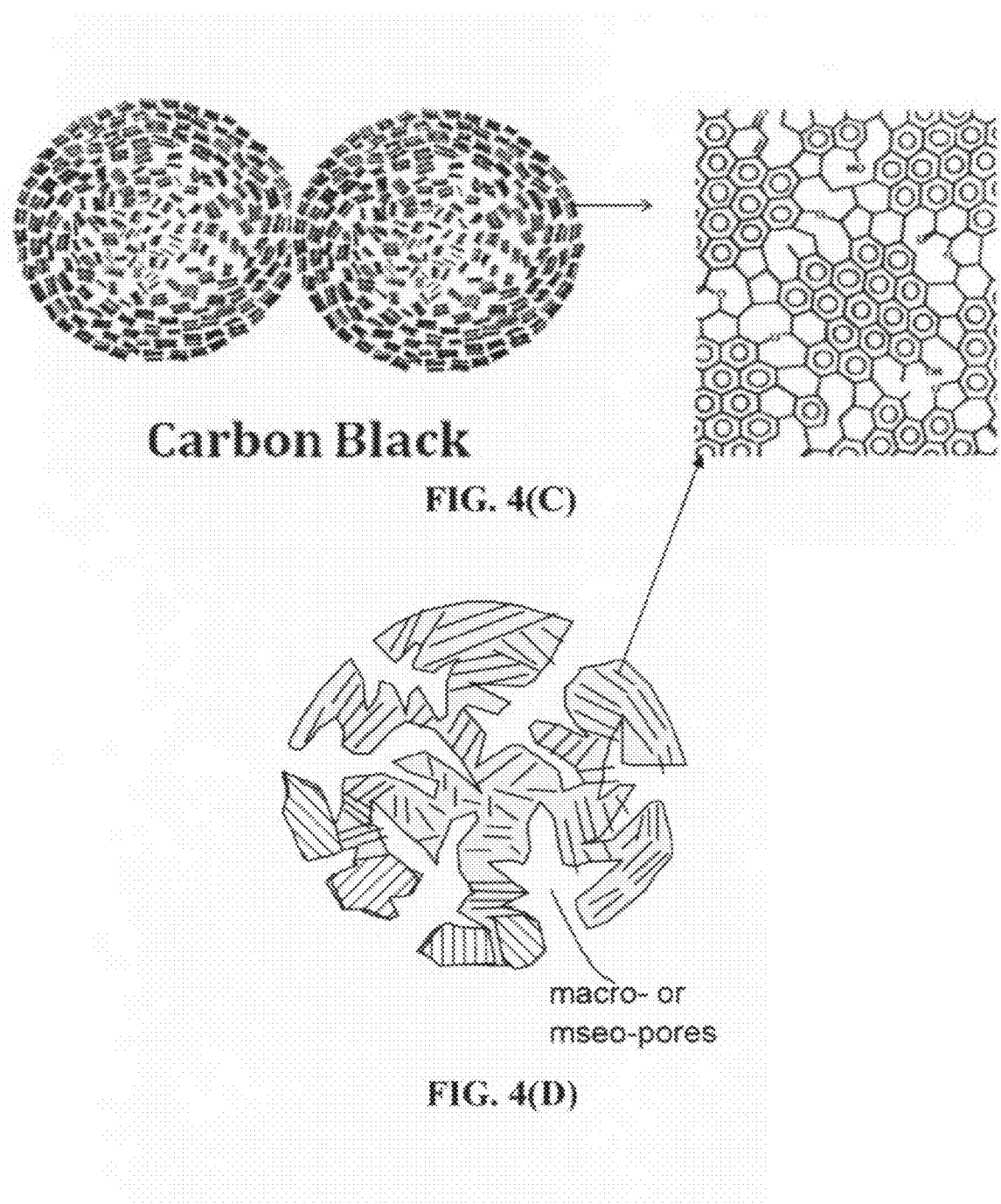

As schematically illustrated in FIG. 4(C), Carbon black (CB), acetylene black (AB), and activated carbon (AC) are typically composed of domains of aromatic rings or small graphene sheets, wherein aromatic rings or graphene sheets in adjoining domains are somehow connected through some chemical bonds in the disordered phase (matrix). These carbon materials are commonly obtained from thermal decomposition (heat treatment, pyrolyzation, or burning) of hydrocarbon gases or liquids, or natural products (wood, coconut shells, etc).

The preparation of polymeric carbons by simple pyrolysis of polymers or petroleum/coal tar pitch materials has been known for approximately three decades. When polymers such as polyacrylonitrile (PAN), rayon, cellulose and phenol formaldehyde were heated above 300° C. in an inert atmosphere they gradually lost most of their non-carbon contents. The resulting structure is generally referred to as a polymeric carbon. Depending upon the heat treatment temperature (HTT) and time, polymeric carbons can be made to be insulating, semi-conducting, or conducting with the electric conductivity range covering approximately 12 orders of magnitude. This wide scope of conductivity values can be further extended by doping the polymeric carbon with electron donors or acceptors. These characteristics uniquely qualify polymeric carbons as a novel, easy-to-process class of electro-active materials whose structures and physical properties can be readily tailor-made.

Polymeric carbons can assume an essentially amorphous structure, or have multiple graphite crystals or stacks of graphene planes dispersed in an amorphous carbon matrix. Depending upon the HTT used, various proportions and sizes of graphite crystals and defects are dispersed in an amorphous matrix. Various amounts of two-dimensional condensed aromatic rings or hexagons (precursors to graphene planes) can be found inside the microstructure of a heat treated polymer such as a PAN fiber. An appreciable amount of small-sized graphene sheets are believed to exist in PAN-based polymeric carbons treated at 300-1,000° C. These species condense into wider aromatic ring structures (larger-sized graphene sheets) and thicker plates (more graphene sheets stacked together) with a higher HTT or longer heat treatment time (e.g., >1,500° C.). These graphene platelets or stacks of graphene sheets (basal planes) are dispersed in a non-crystalline carbon matrix. Such a two-phase structure is a characteristic of some disordered carbon material.

There are several classes of precursor materials to the disordered carbon materials of the instant patent application. For instance, the first class includes semi-crystalline PAN in a fiber form. As compared to phenolic resin, the pyrolized PAN fiber has a higher tendency to develop small crystallites that are dispersed in a disordered matrix. The second class, represented by phenol formaldehyde, is a more isotropic, essentially amorphous and highly cross-linked polymer. The third class includes petroleum and coal tar pitch materials in bulk or fiber forms. The precursor material composition, heat treatment temperature (HTT), and heat treatment time (Htt) are three parameters that govern the length, width, thickness (number of graphene planes in a graphite crystal), and chemical composition of the resulting disordered carbon materials.

In the present investigation, PAN fibers were subjected to oxidation at 200-350° C. while under a tension, and then partial or complete carbonization at 350-1,500° C. to obtain polymeric carbons with various nano-crystalline graphite structures (graphite crystallites). Selected samples of these polymeric carbons were further heat-treated at a temperature in the range of 1,500-2,000° C. to partially graphitize the materials, but still retaining a desired amount of amorphous carbon (no less than 10%). Phenol formaldehyde resin and petroleum and coal tar pitch materials were subjected to similar heat treatments in a temperature range of 500 to 1,500° C. The disordered carbon materials obtained from PAN fibers or phenolic resins are preferably subjected to activation using a process commonly used to produce activated carbon (e.g., treated in a KOH melt at 900° C. for 1-5 hours). This activation treatment is intended for making the disordered carbon meso-porous, enabling liquid electrolyte to reach the edges or surfaces of the constituent aromatic rings after the SMC device is made. Such an arrangement enables the lithium ions in the liquid to readily deposit onto graphene surfaces without having to undergo solid-state diffusion.

Certain grades of petroleum pitch or coal tar pitch may be heat-treated (typically at 250-500° C.) to obtain a liquid crystal-type, optically anisotropic structure commonly referred to as meso-phase. This meso-phase material can be extracted out of the liquid component of the mixture to produce meso-phase particles or spheres.

Physical or chemical activation may be conducted on all kinds of disordered carbon (e.g. a soft carbon, hard carbon, polymeric carbon or carbonized resin, meso-phase carbon, coke, carbonized pitch, carbon black, activated carbon, or partially graphitized carbon) to obtain activated disordered carbon. For instance, the activation treatment can be accomplished through oxidizing, $CO_2$ physical activation, KOH or NaOH chemical activation, or exposure to nitric acid, fluorine, or ammonia plasma (for the purpose of creating electrolyte-accessible pores, not for functionalization).

In summary, the cathode active material and/or the anode active material of the presently invented SMC may be selected from (a) A porous disordered carbon material selected from a soft carbon, hard carbon, polymeric carbon or carbonized resin, meso-phase carbon, coke, carbonized pitch, carbon black, activated carbon, or partially graphitized carbon; (b) A graphene material selected from a single-layer sheet or multi-layer platelet of graphene, graphene oxide, graphene fluoride, hydrogenated graphene, nitrogenated graphene, boron-doped graphene, nitrogen-doped graphene, functionalized graphene, or reduced graphene oxide; (c) Exfoliated graphite; (d) Meso-porous carbon; (e) A carbon nanotube selected from a single-walled carbon nanotube or multi-walled carbon nanotube; (f) A carbon nano-fiber, metal nano-wire, metal oxide nano-wire or fiber, or conductive polymer nano-fiber, or (g) A combination thereof.

The following examples serve to illustrate the preferred embodiments of the present invention and should not be construed as limiting the scope of the invention:

EXAMPLE 1

Functionalized and Non-Functionalized Soft Carbon (One Type of Disordered Carbon), Soft Carbon-Based Super-Battery and Surface-Mediated Cells Non-functionalized and functionalized soft carbon materials were prepared from a liquid crystalline aromatic resin. The resin was ground with a mortar, and calcined at 900° C. for 2 h in a $N_2$ atmosphere to prepare the graphitizable carbon or soft carbon. The resulting soft carbon was mixed with small tablets of KOH (four-fold weight) in an alumina melting pot. Subsequently, the soft carbon containing KOH was heated at 750° C. for 2 h in $N_2$. Upon cooling, the alkali-rich residual carbon was washed with hot water until the outlet water reached a pH value of 7. The resulting material is activated, but non-functionalized soft carbon.

Separately, some portion of the activated soft carbon was then immersed in a 90% $H_2O_2$-10% $H_2O$ solution at 45° C. for an oxidation treatment that lasted for 2 hours. Then, the resulting partially oxidized soft carbon was immersed in HCOOH at room temperature for functionalization for 24 hours. The resulting functionalized soft carbon was dried by heating at 60° C. in a vacuum oven for 24 hours.

Coin cells using functionalized soft carbon as a cathode and functionalized soft carbon as a nano-structured anode (plus a thin piece of lithium foil as a lithium source implemented between a current collector and a separator layer, Sample-1) were made and tested. Corresponding cells without functionalization (Sample-1b) were also prepared and tested for comparison. In all cells, the separator used was one sheet of micro-porous membrane (Celgard 2500). The current collector for each of the two electrodes was a piece of carbon-coated aluminum foil. The electrode was a composite composed of 85 wt. % soft carbon (+5% Super-P and 10% PTFE binder coated on Al foil). The electrolyte solution was 1 M $LiPF_6$ dissolved in a mixture of ethylene carbonate (EC) and dimethyl carbonate (DMC) with a 3:7 volume ratio. The separator was wetted by a minimum amount of electrolyte to reduce the background current. Cyclic voltammetry and galvanostatic measurements of the lithium cells were conducted using an Arbin 32-channel supercapacitor-battery tester at room temperature (in some cases, at a temperature as low as −40° C. and as high as 60° C.).

As a reference sample (Sample-1-CA), similar coin cells, containing a piece of lithium foil at the anode but without a nano-structured carbon layer, were also made and tested. This is a prior art lithium super-battery. Additionally, a symmetric supercapacitor with both electrodes being composed of a functionalized soft carbon material, but containing no additional lithium source than what is available in the liquid electrolyte, was also fabricated and evaluated (Sample-1-

CB). The data was compared to the data of the prior art symmetric supercapacitor (f-LBL-CNT/f-LBL-CNT) of Lee, et al.

Figure 6A:
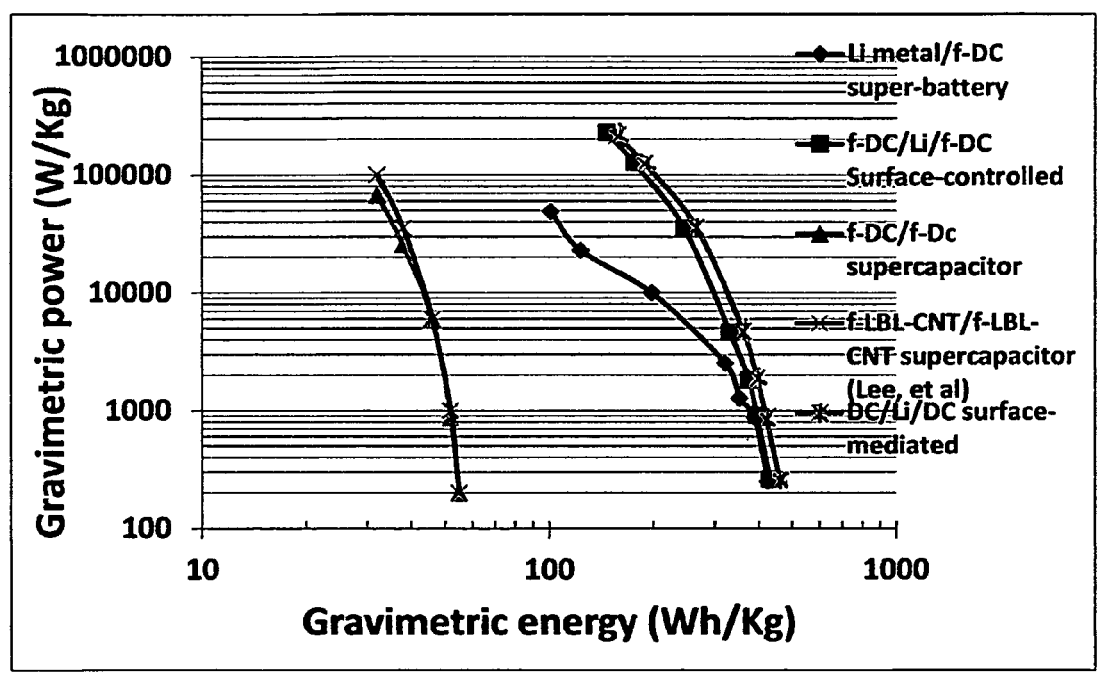
FIG. 6 (A) Ragone plot of five types of cells: two surface-mediated, lithium ion-exchanging battery cells (one with functional groups in both electrode active materials and the other with non-functionalized active materials), a prior art lithium super-battery (formed of a Li metal anode and a functionalized disordered carbon cathode), a prior art symmetric supercapacitor composed of two functionalized disordered carbon electrodes (no lithium foil as a lithium source), and a symmetric supercapacitor based on LBL-CNTs (the data for CNT-based supercapacitor were read off a figure of Lee, et al). (B) Energy density values plotted as a function of the number of charge/discharge cycles for a functionalized surface cell and a non-functionalized SMC.
Figure 6B:
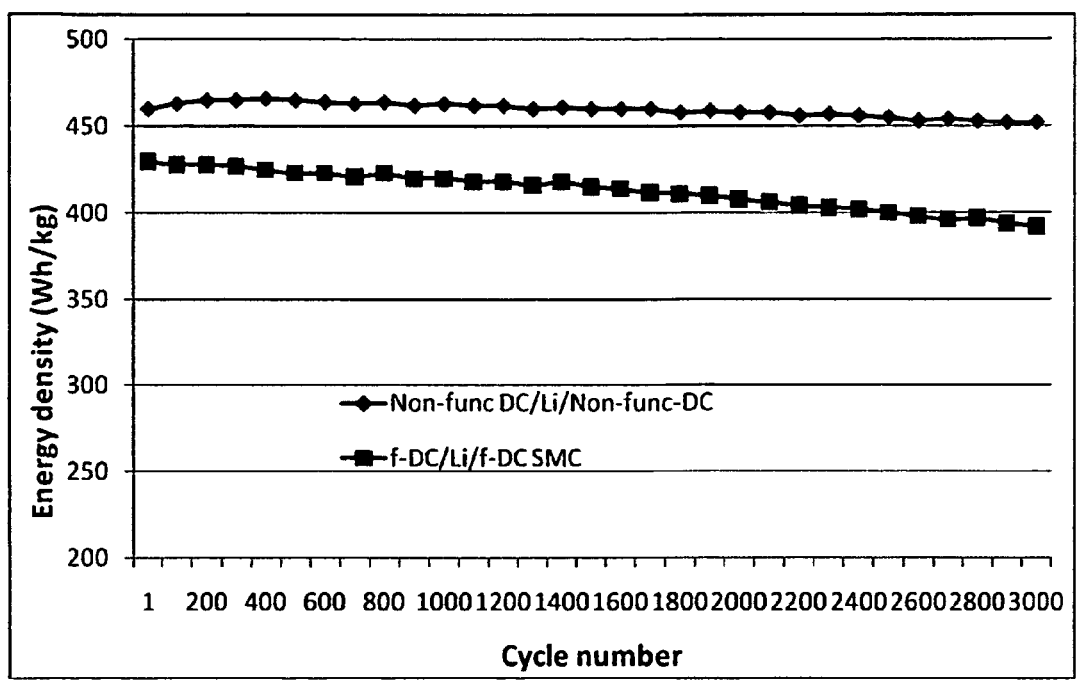

Galvanostatic studies of the super-battery (Sample-1-CA) with such a functionalized soft carbon-based bulk material (thickness>200 µm) as a cathode active material and those of the corresponding surface-controlled battery cell (Sample-1) and non-functionalized surface-mediated cells (Sample-1b) have enabled us to obtain significant data as summarized in the Ragone plot of FIG. 6(A) and cycling stability data (FIG. 6(B)). These plots allow us to make the following observations:

(a) Both the functionalized and non-functionalized surface-controlled, lithium ion-exchanging battery devices exhibit significantly higher energy densities and power densities than those of the corresponding super-battery, particularly at relatively high current densities (higher power density data points in the plot). This demonstrates that the presence of a nano-structured anode (in addition to the nano-structured cathode) enables high rates of lithium ion deposition onto and release from the massive surface areas of the anode during the re-charge and discharge cycles, respectively. The prior art super-battery, having a current collector alone with a limited specific surface area as the anode, cannot provide a sufficient amount of surface area for use by the lithium ions that try to deposit onto or release from the limited surface area all at the same time. The whole charge or discharge process becomes surface-limited.

(b) Both surface-controlled, lithium ion-exchanging battery devices exhibit significantly higher energy densities and power densities than those of the corresponding symmetric supercapacitors (Sample-1-CB) and those of the prior art supercapacitor composed of a functionalized LBL CNT anode and a functionalized LBL-CNT cathode of Lee, et al, both supercapacitors having no lithium foil as a lithium source. Actually, the two symmetric supercapacitors (without a lithium source), based on either disordered carbon or LBL-CNT, exhibit almost identical Ragone plots even though the two electrodes are dramatically different in thickness (>100 µm for the disordered carbon electrode and <3.0 µm for the LBN-CNT electrode). This is likely a manifestation of the local surface adsorption or electric double layer mechanism associated with a conventional supercapacitor that does not require long-range transport of the charges (in particular, requiring no exchange of lithium ions between the anode and the cathode). The amounts of lithium ions and their counter-ions (anions) are limited by the solubility of a lithium salt in the solvent. The amounts of lithium that can be captured and stored in the active material surfaces of either electrode are dramatically higher than this solubility limit.

(c) As mentioned earlier in the Background section, the power density of a state-of-the-art supercapacitor is typically of 5,000-10,000 W/Kg, but that of a lithium-ion battery is 100-500 W/kg. This implies that the presently invented surface-mediated lithium ion-exchanging cells have an energy density comparable to that of a modern battery, which is 5-16 times higher than the energy density of conventional supercapacitors. The SMCs also exhibit a power density (or charge-discharge rates) significantly higher than the power density of conventional electrochemical supercapacitors.

(d) The SMC based on non-functionalized surfaces perform significantly better than the corresponding functionalized surface-controlled cells in terms of both energy density and power density.

(e) Most significantly, the non-functionalized surface-mediated cells exhibit much better cycle stability as compared to the functional material-based cell. As demonstrated in FIG. 6(B), the non-functionalized surface cell maintains a high energy density even after 2500 charge/discharge cycles. However, the functionalized surface-controlled cell suffers a faster decay with repeated charges/discharges.

(f) Further calculations from the obtained data indicate that the discharge time for this prior art super-battery is 19 seconds at the current density of 10 A/g. By contrast, the discharge time for the corresponding SMC is less than 5 seconds at the same current density.

The cells of Sample-1 and Samples-1-CA work on the redox reactions of lithium ions with select functional groups on the surfaces/edges of aromatic rings at the cathode side (Sample-1-CA) and at both the cathode and the anode (Sample-1). These functional groups, attached to both the edge and plane surfaces of aromatic rings (small graphene sheets), are capable of rapidly and reversibly react with lithium. The SMCs based on non-functionalized surfaces perform even better. The surface-mediated lithium ion-exchanging battery of the present invention is a revolutionary new energy storage device that fundamentally differs from a supercapacitor and a lithium-ion battery. In terms of both energy density and power density, neither conventional device even comes close.

EXAMPLE 2

NGPs from Sulfuric Acid Intercalation and Exfoliation of MCMBs

MCMB 2528 microbeads (Osaka Gas Chemical Company, Japan) have a density of about 2.24 $g/cm^3$; a median size of about 22.5 microns, and an inter-planar distance of about 0.336 nm. MCMB 2528 (10 grams) were intercalated with an acid solution (sulfuric acid, nitric acid, and potassium permanganate at a ratio of 4:1:0.05) for 24 hours. Upon completion of the reaction, the mixture was poured into deionized water and filtered. The intercalated MCMBs were repeatedly washed in a 5% solution of HCl to remove most of the sulphate ions. The sample was then washed repeatedly with deionized water until the pH of the filtrate was neutral. The slurry was dried and stored in a vacuum oven at 60° C. for 24 hours. The dried powder sample was placed in a quartz tube and inserted into a horizontal tube furnace pre-set at a desired temperature, 600° C. for 30 seconds to obtain exfoliated graphite. The exfoliated MCMB sample was subjected to further functionalization in formic acid at 25° C. for 30 minutes in an ultrasonication bath to obtain functionalized graphene (f-NGP). Non-functionalized NGPs were also obtained via ultrasonication of exfoliated MCMBs in water without any functionalizing agent.

Figure 7A:
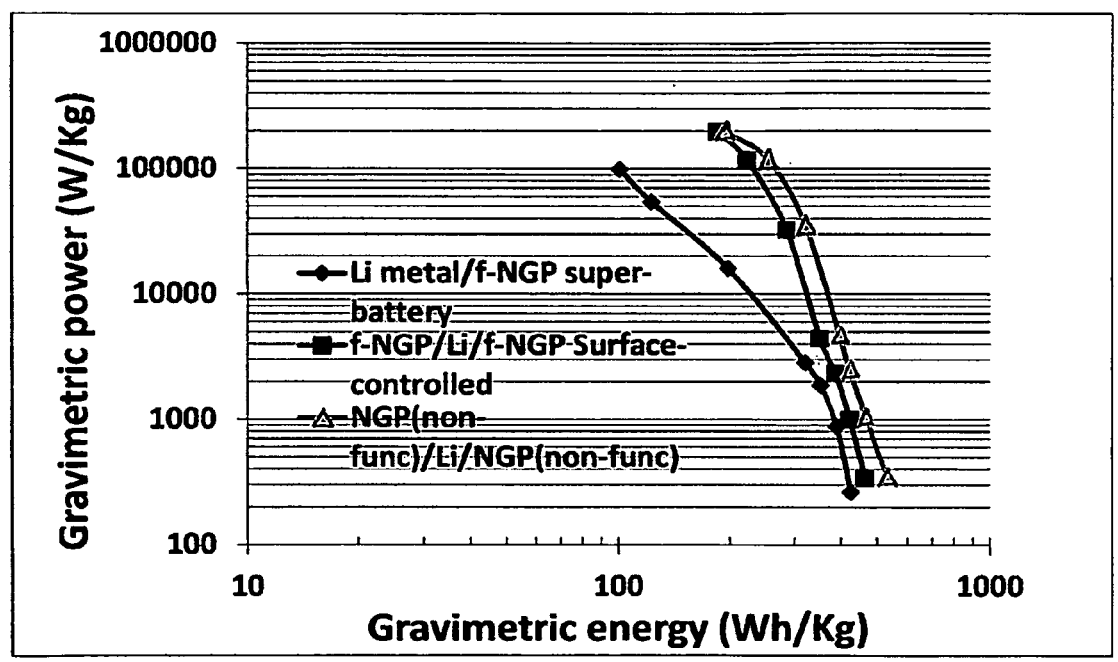
FIG. 7. (A) Ragone plots of a functionalized NGP-based lithium super-battery and two corresponding surface-mediated, lithium ion-exchanging battery devices (one with functional groups and one without a functional group). These data further demonstrate that the surface-mediated devices perform much better than the super-battery, particularly when at the higher densities (higher power density region). (B) Lonterm cycling stability of a SMC of the instant application vs. that of a SMC (with functional groups in its electrodes) of an earlier application.
Figure 7B:
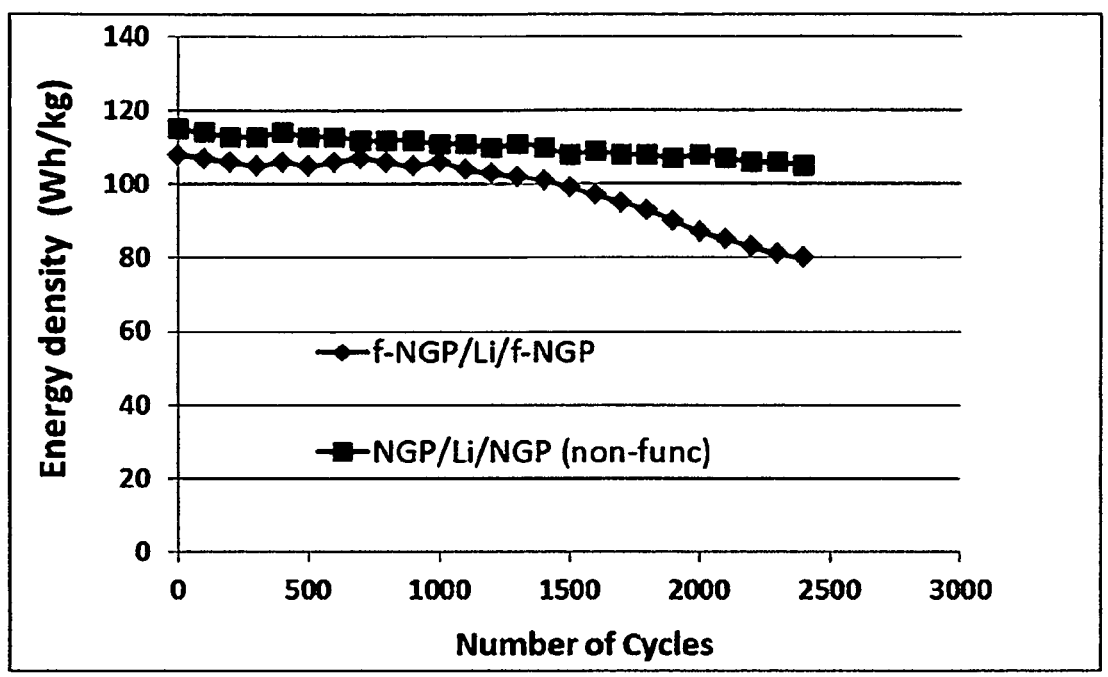

For a functionalized or non-functionalized surface-controlled battery, NGPs were used as both a cathode material and as an anode material. A lithium foil was added between the anode and the separator. For a reference super-battery, the anode is a lithium foil (no nano-structured NGP) and the cathode is f-NGP. The Ragone plot for these three types of cells is shown in FIG. 7. Both of the NGP-based, surface-mediated, lithium ion-exchanging battery devices exhibit significantly higher energy densities and power densities than those of the corresponding super-battery, particularly at relatively high current densities (higher power density data points in the plot). This again demonstrates the superior performance of the SMCs over the super-battery. The non-functionalized surface-mediated cell performs better than the functionalized surface-controlled cell in terms of energy density and power density. Also quite significantly and surprisingly, as compared with the functionalized surface-mediated cell, the non-functionalized surface-mediated cell exhibits a much better long-term stability as repeated charges/discharges continue (FIG. 8).

EXAMPLE 3

SMCs Based on Graphene Materials (NGPs) from Natural Graphite, Carbon Fibers, and Artificial Graphite and Based on Carbon Black (CB) and Treated CB Oxidized NGP or graphene oxide (GO) was prepared with a modified Hummers' method that involved exposing the starting graphitic materials to a mixture of sulfuric acid, sodium nitrate, and potassium permanganate at a ratio of 4:1:0.1 for 72 hours. The resulting GO was then thoroughly rinsed with water to obtain GO suspension, which was followed by two different routes of material preparation. One route involved subjecting the GO suspension to ultrasonication to obtain isolated graphene oxide sheets suspended in water (for Cell-N). The other route involved spray-drying GO suspension to obtain graphite intercalation compound (GIC) or GO powder. The GIC or GO powder was then thermally exfoliated at 1,050° C. for 45 seconds to obtain exfoliated graphite or graphite worms (Cell-G). Exfoliated graphite worms from artificial graphite and carbon fibers were then subjected to ultrasonication to separate or isolate oxidized graphene sheets (Cell-M and Cell-C, respectively). Carbon black (CB) was subjected to a chemical treatment similar to the Hummers' method to open up nano-gates, enabling electrolyte access to the interior (Cell t-CB).

Each electrode, composed of 85% graphene, 5% Super-P (AB-based conductive additive), and 10% PTFE, was coated on Al foil. The thickness of the electrode was typically around 150-200 µm, but an additional series of samples with thicknesses of approximately 80, 100, 150 µm was prepared to evaluate the effect of electrode size on the power and energy densities of the resulting supercapacitor-battery cells. Electrodes as thin as 20 µm were also made for comparison. The electrode was dried in a vacuum oven at 120° C. for 12 hours before use. The negative electrode was Li metal supported on a layer of graphene sheets. Coin-size cells were assembled in a glove box using 1M $LiPF_6$/EC+DMC as electrolyte.

EXAMPLE 4

Functionalized and Non-Functionalized Activated Carbon

Activated carbon (AC, from Ashbury Carbon Co.) was treated with an acid solution (sulfuric acid, nitric acid, and potassium permanganate at a ratio of 4:1:0.05) for 24 hours. Upon completion of the reaction, the mixture was poured into deionized water and filtered. The treated AC was repeatedly washed in a 5% solution of HCl to remove most of the sulphate ions. The sample was then washed repeatedly with deionized water until the pH of the filtrate was neutral. The slurry was subjected to further functionalization in formic acid at 25° C. for 30 minutes in an ultrasonication bath. Subsequently, dip-coating was used to obtain thin films of chemically functionalized activated carbon (f-AC) with a thickness of typically between 20 and 150 µm coated on a surface of an aluminized carbon layer as a current collector. Such an electrode was used as an anode and the same type of material was used as a cathode, with a lithium foil implements between a porous separator and one electrode as a lithium source. A corresponding SMC cell without the functionalization treatment was also prepared and tested.

The capacity was measured with galvanostatic experiments using an Arbin SCTS electrochemical testing instrument. Cyclic voltammetry (CV) was conducted on a CHI 660 Instruments electrochemical workstation. Scanning electron microscopy (SEM, Hitachi S-4800), transmission electron microscopy (TEM, Hitachi H-7600), FTIR (PerkinElmer GX FT-IR), Raman spectroscopy (Renishaw in Via Reflex Micro-Raman), and atomic force microscopy were used to characterize the chemical compositions and microstructure of the NGP and exfoliated graphite samples.

Figure 8A:
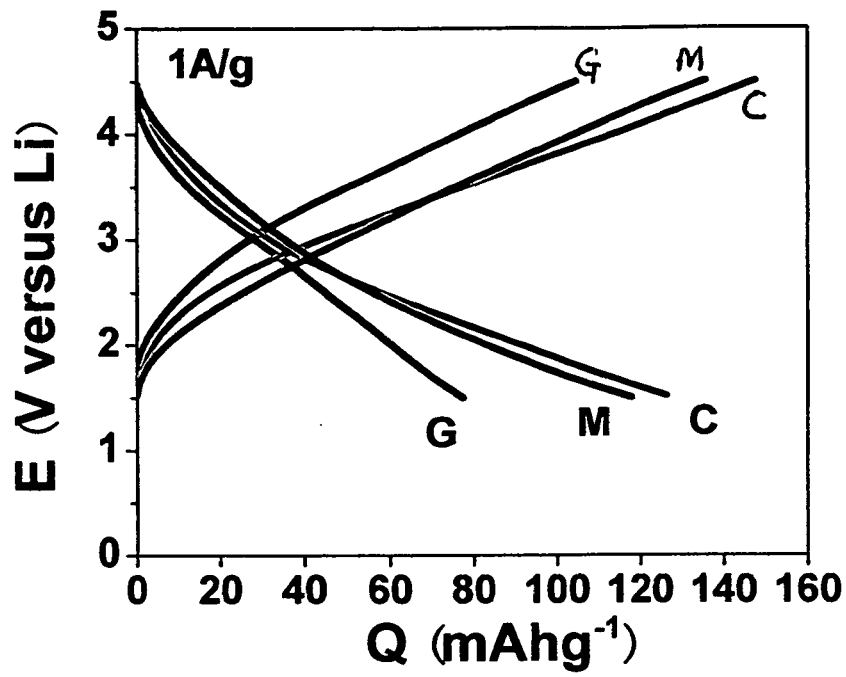
FIG. 8. (A) Charge/discharge curves of three surface-enabled cells (M=NGP from graphite, C=NGP from carbon fibers, and G=exfoliated graphite, EG). The discharge current density is 1 A/g, (B) the CV plots of the same cells at the scan rate 25 mV/s, (c) Ragone plot of these cells with thick cathodes (200 μm), (D) The Ragone plots of NGP, CB (carbon black), t-CB (chemically treated CB), and AC-based surface-mediated cells with thick cathodes. All energy density and power density values are cell-level values calculated based on total cell weights.
Figure 8B:
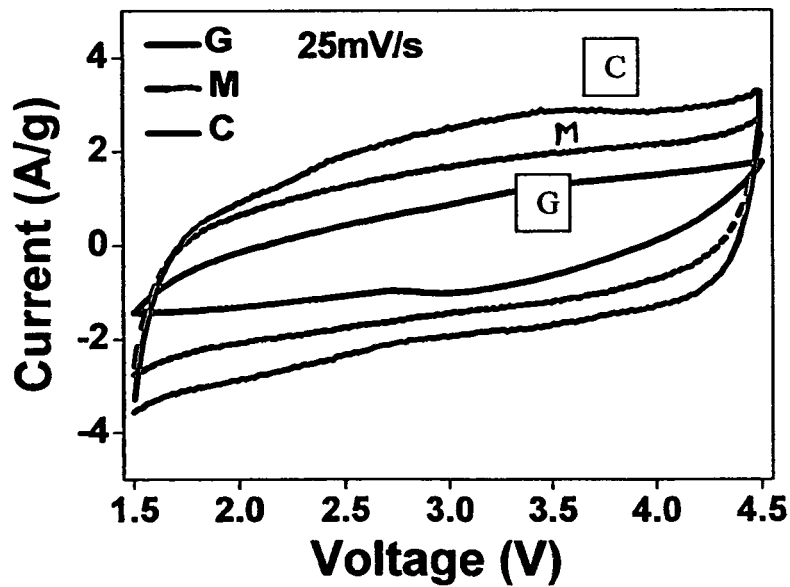
Figure 8C:
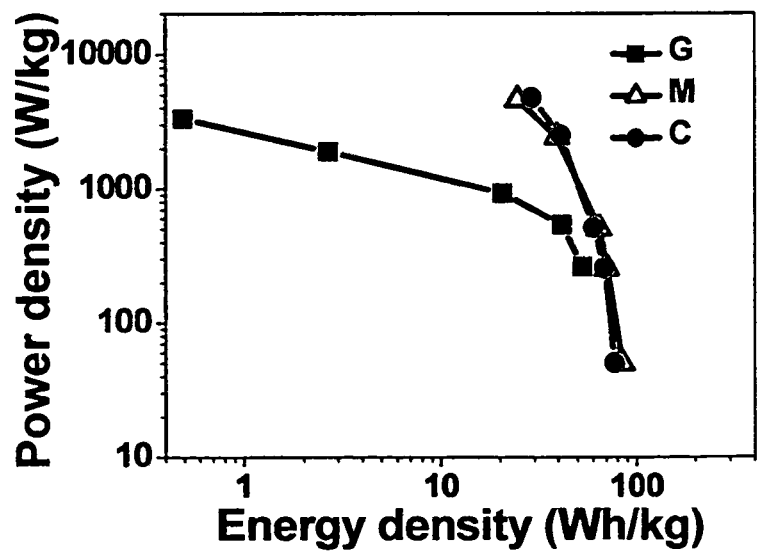

The NGP-mediated electrodes provide the cells (e.g. Cell M) with a specific capacitance of 127 mAh/g at a current density of 1 A/g, reaching a cell-level energy density of 85 Wh/$kg_{cell}$ (FIG. 8(C)) at a current density of 0.1 A/g, which is 17 times higher than the typically 5 Wh/$kg_{cell}$ of commercial AC-based symmetric supercapacitors.

Figure 8D:
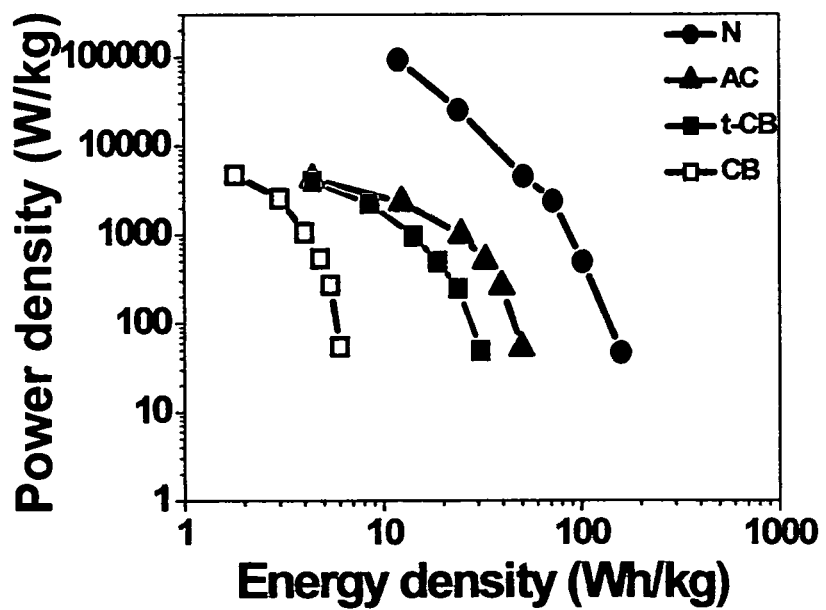

Another graphene surface-mediated cell (Cell-N, FIG. 8(D)) exhibits an even higher energy density of 160 Wh/$kg_{cell}$, comparable to that of a lithium-ion battery. The energy density of Cell-N maintains a value over 51.2 Wh/$kg_{cell}$ even at a current density as high as 10 A/g, delivering a power density of 4.55 kW/$kg_{cell}$. The power density of commercial AC-based symmetric supercapacitors is typically in the range of 1-10 kW/$kg_{cell}$ at an energy density of 5 Wh/$kg_{cell}$, This implies that, compared with a conventional supercapacitor at the same power density, the surface-mediated devices can deliver >10 times the energy density.

The power density is 25.6 kW/$kg_{cell}$ at 50 A/g with an energy density of 24 Wh/$kg_{cell}$. The power density increases to 93.7 kW/$kg_{cell}$ at 200 A/g with an energy density of 12 Wh/$kg_{cell}$ (FIG. 8(D)). This power density is one order of magnitude higher than that of conventional supercapacitors that are noted for their high power densities, and 2-3 orders of magnitude higher than those (typically 0.1-1.0 kW/$kg_{cell}$) of conventional lithium-ion batteries. These data have clearly demonstrated that the surface-enabled cells are a class of energy storage cells by itself, distinct from both conventional supercapacitors and lithium-ion batteries.

FIG. 8(B) contains a comparison of CV data showing that the carbon fiber-derived graphene has slightly better performance than graphite-derived graphene as an electrode active material. This is likely due to the more curved or wrinkled shapes of fiber-derived graphene, which avoid complete face-to-face re-stacking of graphene sheets during electrode preparation. The lower energy density and power density of the exfoliated graphite-based cell (Cell-G) relative to the fully separated NGP-based (Cells M and C) might be ascribed to a lower specific surface area of EG (typically 200-300 $m^2$/g based on BET measurements), as opposed to the typically 600-900 $m^2$/g of mostly isolated single-layer graphene sheets.

FIG. 8(D) indicates that the energy density and power density values of carbon black (CB) can be significantly increased by subjecting CB to an activation/functionalization treatment that involves an exposure to a mixture of sulfuric acid, sodium nitrate, and potassium permanganate for 24 hours. The BET surface area was found to increase from approximately 60 $m^2$/g to approximately 300 $m^2$/g, resulting in a capacity increase from 8.47 mAh/g to 46.63 mAh/g). The cell with treated carbon black electrodes exhibits power and energy densities comparable to those of activated carbon electrode.

Figure 10B:
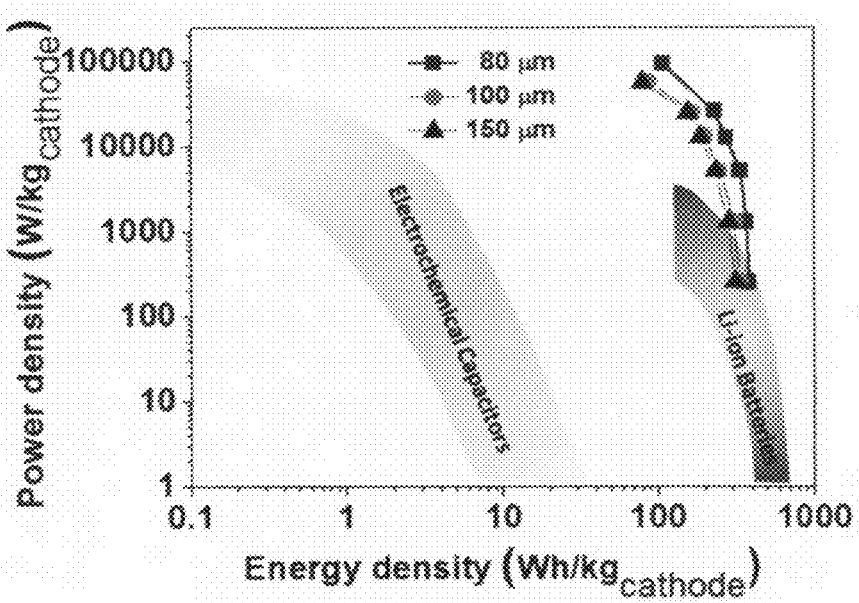

FIG. 10 show the Ragone plots of graphene surface-enabled Li ion-exchanging cells with different electrode thicknesses. The energy density and power density values were calculated based on total cell weight in FIG. 10(A) and based on the cathode weight only in FIG. 10(B). These data show that the electrode thickness plays a critical role in dictating the energy density and power density of a SMC. Most significantly, these data have clearly demonstrated that our SMCs having thick electrodes can perform very well, without having to use expensive and slow processes (such as layer-by-layer, LBL, proposed by Lee, et al) to make ultra-thin electrodes for use in CNT-based super-batteries. FIG. 10 has also clearly demonstrated that the surface-mediated cells are a class of energy storage cells by itself, distinct from both supercapacitors and lithium-ion batteries.

Figure 12:
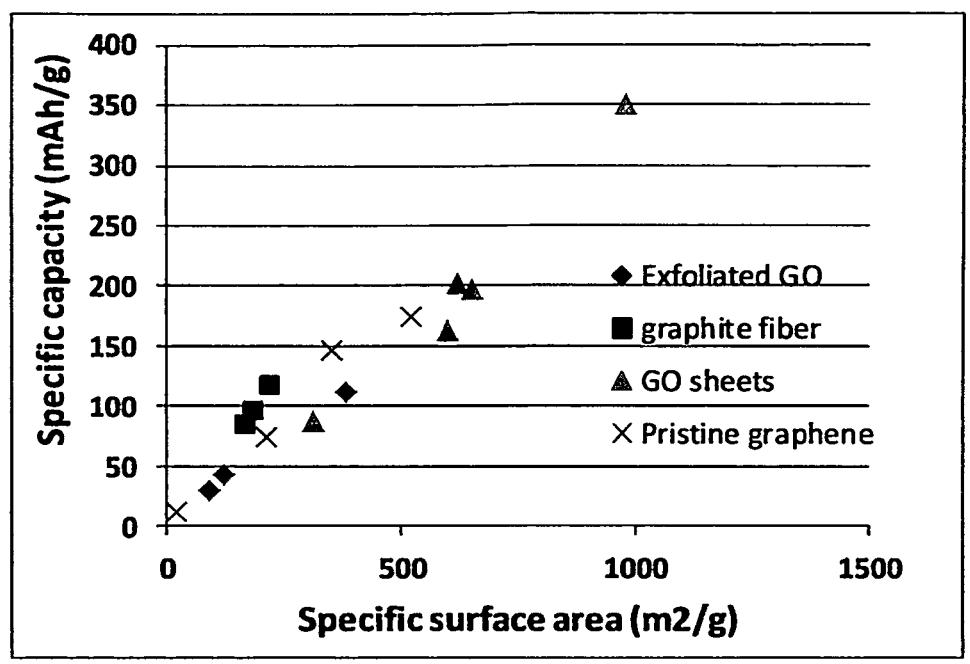
FIG. 12 The specific capacity plotted as a function of the electrode specific surface area for several cells. The electrodes were prepared from various different graphene related materials.

FIG. 12 indicates that the specific surface area of the electrode is the single most important parameter in dictating the lithium storage capacity. The data point having the highest specific capacity in this plot is obtained from a chemically reduced graphene oxide. Our chemical analysis data indicate that this heavily reduced graphene material has an oxygen content less than 2.0%, suggesting that essentially no functional group exists. Heavily oxidized graphene, upon chemical or thermal reduction, is known to have a fair amount of surface defect sites. This and other several data points confirm the significance of the surface trapping mechanism. Four data points (denoted by "x") are for pristine graphene electrodes wherein the graphene material was obtained from direct ultra-sonication of pure graphite (>99.9% carbon). These data points show that pure graphene surfaces (with benzene ring centers, and without surface defect or functional group) are equally capable of capturing lithium ions from electrolyte and storing comparable amounts of lithium on a per unit surface area basis.

The long-term stability of these SMC cells is remarkable (FIG. 11). Most surprisingly, those non-functionalized surface-based SMC cells (Cells N and AC) exhibit a capacity that, after some slight decay during the first 300 cycles, increases with the number of cycles thereafter. This is rather unique and unexpected. This has never been observed with any conventional supercapacitor, lithium ion capacitor, lithium-ion battery, lithium super-battery, or functionalized surface-controlled cell.

In conclusion, the instant invention provides a revolutionary energy storage device that has the best features of both the supercapacitor and the lithium ion battery. These fully surface-enabled, lithium ion-exchanging cells, with their materials and structures yet to be optimized, are already capable of storing an energy density of 160 Wh/$kg_{cell}$, which is 30 times higher than that of conventional electric double layer (EDL) supercapacitors. The power density of 100 kW/$kg_{cell}$ is 10 times higher than that (10 kW/$kg_{cell}$) of conventional EDL supercapacitors and 100 times higher than that (1 kW/$kg_{cell}$) of conventional lithium-ion batteries. These surface-mediated cells can be re-charged in seconds, as opposed to hours for conventional lithium ion batteries. This is truly a major breakthrough and revolutionary technology.

We claim:

1. A surface-mediated, lithium ion-exchanging energy storage device comprising: (a) a positive electrode (cathode) comprising a cathode active material having a surface area to capture or store lithium thereon; (b) a negative electrode (anode) comprising an anode active material having a surface area to capture or store lithium thereon; (c) a porous separator disposed between the two electrodes; and (d) a lithium-containing electrolyte in physical contact with the two electrodes, wherein at least 80% of the lithium is stored on surfaces of said anode active material when the device is in a charged state, or at least 80% of the lithium is stored on surfaces of said cathode active material when the device is in a discharged state and wherein said cathode active material has a specific surface area of no less than 100 $m^2$/g being in direct physical contact with said electrolyte to receive lithium ions therefrom or to provide lithium ions thereto; wherein at least one of the two electrodes contains therein a lithium source prior to a first charge or a first discharge cycle of the energy storage device and wherein at least the cathode active material is not a chemically functionalized material and does not bear a chemical functional group that chemically reacts with lithium; and wherein at least said cathode active material consists of a material selected from:
(A) a porous disordered carbon material selected from a soft carbon, hard carbon, polymeric carbon or carbonized resin, meso-phase carbon, coke, carbonized pitch, activated carbon, or partially graphitized carbon;
(B) a graphene material selected from a single-layer sheet or multi-layer platelet of pristine graphene, graphene fluoride, hydrogenated graphene, nitrogenated graphene, boron-doped graphene, nitrogen-doped graphene, or chemically reduced graphene;
(C) exfoliated graphite;
(D) meso-porous carbon;
(E) a carbon nanotube selected from a single-walled carbon nanotube or multi-walled carbon nanotube;
(F) a carbon nano-fiber, metal nano-wire, metal oxide nano-wire or fiber, or conductive polymer nano-fiber, or a combination thereof.

2. The energy storage device of claim 1, wherein said device has an open-circuit voltage of at least 0.6 volts.

3. The energy storage device of claim 1, wherein said device has an open-circuit voltage of at least 0.8 volts.

4. The energy storage device of claim 1, wherein said device has an open-circuit voltage of at least 1.0 volts.

5. The energy storage device of claim 1, wherein said device has an open-circuit voltage of at least 1.2 volts.

6. The energy storage device of claim 1, wherein at least 90% of the lithium is stored on surfaces of said anode active material, with said lithium being in direct physical contact with said anode surfaces, when the device is in a charged state, or at least 90% of the lithium is stored on surfaces of said cathode active material, with said lithium being in direct physical contact with said cathode surfaces, when the device is in a discharged state.

7. The energy storage device of claim 1, wherein the electrolyte is liquid electrolyte or gel electrolyte containing a first amount of lithium ions.

8. The energy storage device of claim 1, wherein a charge or discharge operation of said device does not involve lithium intercalation or solid state diffusion.

9. The energy storage device of claim 7, wherein an operation of said device involves an exchange of a second amount of lithium ions between said cathode and said anode and said second amount of lithium is greater than said first amount.

10. The energy storage device of claim 1, wherein said anode active material is not intercalated or de-intercalated with lithium when said device is in operation.

11. The energy storage device of claim 1, wherein said device operates in a voltage range of from 1.0 volts to 4.5 volts.

12. The energy storage device of claim 1, wherein said device operates in a voltage range of from 1.5 volts to 4.0 volts.

13. The energy storage device of claim 1, wherein said device operates in a voltage range above 1.5 volts.

14. The energy storage device of claim 1, wherein at least one of the two electrodes has a specific surface area of no less than 500 m²/g that is in direct contact with said electrolyte.

15. The energy storage device of claim 1, wherein at least one of the two electrodes has a specific surface area of no less than 1,000 m²/g that is in direct contact with said electrolyte.

16. The energy storage device of claim 1, wherein at least one of the two electrodes has a specific surface area of no less than 1,500 m²/g that is in direct contact with said electrolyte.

17. The energy storage device of claim 1, wherein at least one of the two electrodes has a specific surface area of no less than 2,000 m²/g that is in direct contact with said electrolyte.

18. The energy storage device of claim 1, wherein an electric double layer mechanism contributes to less than 10% of the charge storage capacity of said device.

19. The energy storage device of claim 1, wherein no more than 20% of the lithium is stored in the bulk of said anode active material when the device is in a charged state, or no more than 20% of the lithium is stored in the bulk of said cathode active material when the device is in a discharged state.

20. The energy storage device of claim 1, wherein no more than 10% of the lithium is stored in the bulk of said anode active material when the device is in a charged state, or no more than 10% of the lithium is stored in the bulk of said cathode active material when the device is in a discharged state.

21. The energy storage device of claim 1, wherein an operation of said device does not involve lithium intercalation or de-intercalation.

22. The energy storage device of claim 1, wherein the lithium source comprises a lithium chip, lithium foil, lithium powder, surface stabilized lithium particles, lithium film coated on a surface of an anode or cathode active material, or a combination thereof.

23. The energy storage device of claim 1, wherein said anode active material is pre-loaded with lithium before or when the device is made.

24. The energy storage device of claim 1, wherein said anode active material is prelithiated with a surface area being pre-coated or pre-plated with lithium before or when said device is made.

25. The energy storage device of claim 1, wherein the anode active material or the cathode active material has a surface area that does not contain a functional group thereon, and said functional group-free surface is exposed to said electrolyte.

26. The energy storage device of claim 1 wherein said anode active material is selected from:
   (a) A porous disordered carbon material selected from a soft carbon, hard carbon, polymeric carbon or carbonized resin, meso-phase carbon, coke, carbonized pitch, activated carbon, or partially graphitized carbon;
   (b) A graphene material selected from a single-layer sheet or multi-layer platelet of graphene, graphene oxide, graphene fluoride, hydrogenated graphene, nitrogenated graphene, boron-doped graphene, nitrogen-doped graphene, or chemically or thermally reduced graphene oxide;
   (c) Exfoliated graphite;
   (d) Meso-porous carbon;
   (e) A carbon nanotube selected from a single-walled carbon nanotube or multi-walled carbon nanotube;
   (f) A carbon nano-fiber, metal nano-wire, metal oxide nano-wire or fiber, or conductive polymer nano-fiber, or
   (g) A combination thereof.

27. The energy storage device of claim 26 wherein said disordered carbon material is formed of two phases with a first phase being graphite crystals or stacks of graphene planes and a second phase being non-crystalline carbon, and wherein the first phase is dispersed in the second phase or bonded by the second phase.

28. The energy storage device of claim 1 wherein said anode active material or cathode active material is a graphene material containing no functional group.

29. The energy storage device of claim 1 wherein said anode active material or cathode active material does not include a functionalized material bearing a chemical functional group that reacts with lithium, and each of said anode active material and cathode active material is selected from:
   (A) A porous disordered carbon material selected from a soft carbon, hard carbon, polymeric carbon or carbonized resin, meso-phase carbon, coke, carbonized pitch, activated carbon, or partially graphitized carbon;
   (B) A graphene material selected from a single-layer sheet or multi-layer platelet of pristine graphene, graphene fluoride, hydrogenated graphene, nitrogenated graphene, boron-doped graphene, nitrogen-doped graphene, or chemically reduced graphene;
   (C) Exfoliated graphite;
   (D) Meso-porous carbon;
   (E) A carbon nanotube selected from a single-walled carbon nanotube or multi-walled carbon nanotube;
   (F) A carbon nano-fiber, metal nano-wire, metal oxide nano-wire or fiber, or conductive polymer nano-fiber, or a combination thereof.

30. The energy storage device of claim 1 wherein said anode active material or cathode active material is a non-functionalized graphene material selected from a single-layer sheet or multi-layer platelet of pristine graphene, graphene fluoride, hydrogenated graphene, nitrogenated graphene, boron-doped graphene, nitrogen-doped graphene, or chemically or thermal reduced graphene.

31. The energy storage device of claim 1 wherein said anode active material or said cathode active material is a non-functionalized graphene material selected from a single-layer sheet or multi-layer platelet of graphene, graphene oxide, graphene fluoride, hydrogenated graphene, nitrogenated graphene, boron-doped graphene, nitrogen-doped graphene, doped graphene, or chemically or thermally reduced graphene oxide.

32. The energy storage device of claim 1 wherein said anode active material or said cathode active material is a non-functionalized single-walled or multi-walled carbon nanotube (CNT), oxidized CNT, fluorinated CNT, hydrogenated CNT, nitrogenated CNT, boron-doped CNT, nitrogen-doped CNT, or doped CNT.

33. The energy storage device of claim 1 wherein said lithium source is selected from lithium metal, a lithium metal alloy, a mixture of lithium metal or lithium alloy with a lithium intercalation compound, a lithiated compound, lithiated titanium dioxide, lithium titanate, lithium manganate, a lithium transition metal oxide, $Li_4Ti_5O_{12}$, or a combination thereof.

34. The energy storage device of claim 33, wherein the lithium intercalation compound or lithiated compound is selected from the following groups of materials:
   (a) Lithiated silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof;

(b) Lithiated alloys or intermetallic compounds of Si, Ge, Sn, Pb, Sb, Bi, Zn, Al, Ti, Co, Ni, Mn, Cd, and their mixtures;

(c) Lithiated oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof, and (d) Lithiated salts or hydroxides of Sn.

35. The energy storage device of claim 1 wherein said electrolyte comprises a lithium salt-doped ionic liquid.

36. The energy storage device of claim 1 wherein said device provides an energy density of no less than 200 Wh/kg and power density no lower than 30 Kw/kg, all based on a single electrode weight.

37. The energy storage device of claim 1 wherein said device provides an energy density of no less than 300 Wh/kg and power density no lower than 40 Kw/kg, all based on a single electrode weight.

38. The energy storage device of claim 1 wherein said device provides an energy density of no less than 400 Wh/kg or power density no less than 50 Kw/kg, all based on a single electrode weight.

39. The energy storage device of claim 1 wherein said device provides an energy density of no less than 600 Wh/kg or a power density no less than 100 Kw/kg, all based on a single electrode weight.

40. The energy storage device of claim 1 wherein said positive electrode has a thickness greater than 5 µm.

41. The energy storage device of claim 1 wherein said positive electrode has a thickness greater than 50 µm.

42. The energy storage device of claim 1 wherein said positive electrode has a thickness greater than 100 µm.

43. A method of operating the energy storage device of claim 1, said method including implementing a lithium source at the anode and ionizing said lithium source to release lithium ions into said electrolyte during the first discharge cycle of said device.

44. A method of operating the energy storage device of claim 1, said method including implementing a lithium source at the cathode and operating said lithium source to release lithium ions into said electrolyte during the first charge cycle of said device.

45. A method of operating the energy storage device of claim 1, said method including implementing a lithium source at the anode, ionizing said lithium source to release lithium ions into said electrolyte during the first discharge cycle of said device, and electrochemically driving said released lithium ions to said cathode where said released lithium ions are captured by said cathode active material surfaces.

46. The method of claim 45, further comprising a step of releasing lithium ions from said cathode surfaces during a re-charge cycle of said device, electrically driving said released lithium ions to said anode active material surfaces using an external battery charging device.

47. The method of claim 46, wherein both the charge and discharge of said device do not involve lithium intercalation or solid state diffusion.

48. A method of operating a surface-mediated energy storage device, said method including:
   (A) Providing a surface-mediated cell comprising an anode, a lithium source, a porous separator, liquid or gel electrolyte, and a cathode, wherein both the anode and the cathode have a non-functionalized material having lithium-capturing surfaces;
   (B) Releasing lithium ions from said lithium source into said electrolyte during the first discharge of said device; and
   (C) Exchanging lithium ions between the lithium-capturing surfaces of said anode and the lithium-capturing surfaces of said cathode during a subsequent charge or discharge.

49. A method of operating a surface-mediated energy storage device, said method including:
   (A) Providing a surface-mediated cell comprising an anode, a lithium source, a porous separator, electrolyte having an initial amount of lithium ions, and a cathode, wherein both the anode and the cathode have a material having lithium-capturing surfaces in contact with said electrolyte;
   (B) Releasing lithium ions from said lithium source into said electrolyte during the first discharge of said device;
   (C) Operating said cathode to capture lithium ions from said electrolyte and store said captured lithium on cathode surfaces; and
   (D) Exchanging an amount of lithium ions, greater than said initial amount, between the lithium-capturing surfaces of said anode and the lithium-capturing surfaces of said cathode during a subsequent charge or discharge operation, wherein said charge operation involves no lithium intercalation.

50. The method of claim 49, wherein said cathode surfaces have a specific surface area greater than 100 $m^2/g$.

51. The method of claim 49, wherein said cathode surfaces have a specific surface area greater than 1,000 $m^2/g$.

52. The method of claim 49, wherein said cathode surfaces have a specific surface area greater than 2,000 $m^2/g$.

* * * * *